United States Patent
Imai et al.

(10) Patent No.: US 10,428,758 B2
(45) Date of Patent: Oct. 1, 2019

(54) FUEL INJECTION CONTROLLER AND FUEL INJECTION CONTROL METHOD FOR INTERNAL COMBUSTION ENGINE

(71) Applicant: TOYOTA JIDOSHA KABUSHIKI KAISHA, Toyota-shi, Aichi-ken (JP)

(72) Inventors: Sohichi Imai, Toyota (JP); Masanao Idogawa, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 41 days.

(21) Appl. No.: 15/880,929

(22) Filed: Jan. 26, 2018

(65) Prior Publication Data

US 2018/0230931 A1 Aug. 16, 2018

(30) Foreign Application Priority Data

Feb. 13, 2017 (JP) ................................. 2017-024120

(51) Int. Cl.

| F02D 41/40 | (2006.01) |
|---|---|
| F02M 37/04 | (2006.01) |
| F02M 51/06 | (2006.01) |

(52) U.S. Cl.
CPC ...... *F02D 41/40* (2013.01); *F02D 2200/0602* (2013.01); *F02D 2200/0614* (2013.01); *F02D 2250/12* (2013.01); *F02D 2250/14* (2013.01); *F02M 37/043* (2013.01); *F02M 51/061* (2013.01)

(58) Field of Classification Search
CPC ........ F02D 41/40; F02D 41/20; F02D 41/401; F02D 2041/2024; F02D 2250/12; F02D 2250/14; F02D 2200/0602; F02D 2200/0614; F02M 51/061; F02M 37/043
USPC ........... 123/490; 701/105; 73/114.43, 114.49
See application file for complete search history.

(56) References Cited

U.S. PATENT DOCUMENTS 6,142,121 A * 11/2000 Nishimura ............ F02D 41/008
123/447
6,354,274 B1 3/2002 Shima et al.
(Continued)

FOREIGN PATENT DOCUMENTS

| DE | 10303765 A1 | 9/2003 |
|---|---|---|
| DE | 10357158 A1 | 7/2005 |

(Continued)

*Primary Examiner* — Hai H Huynh
(74) *Attorney, Agent, or Firm* — Oliff PLC

(57) ABSTRACT

A fuel injection controller for an internal combustion engine includes first and second calculation sections. The first calculation section acquires a fuel pressure at a predetermined point of time before an injection starting point of time and calculates an injection time using the acquired fuel pressure. The second calculation section acquires a fuel pressure when the injection starting point of time arrives and calculates the injection time by using the acquired fuel pressure. The controller is configured to, before starting the energization to the injector, set a point of time to stop energization to an injector based on a calculation result of the injection time by the first calculation section. The controller is also configured to, after starting the energization to the injector, reset the point of time to stop the energization to the injector based on a calculation result of the injection time by the second calculation section.

8 Claims, 9 Drawing Sheets

(56) References Cited

U.S. PATENT DOCUMENTS

| | | | |
|---|---|---|---|
| 8,010,277 B2* | 8/2011 | Ishizuka | F02D 41/123 123/198 DB |
| 8,640,670 B2* | 2/2014 | Yamada | F02D 41/402 123/299 |
| 2004/0080242 A1* | 4/2004 | Ohnishi | F02D 41/2096 310/314 |
| 2008/0236548 A1 | 10/2008 | Iihoshi et al. | |
| 2009/0125212 A1 | 5/2009 | Kurashima et al. | |
| 2018/0320606 A1* | 11/2018 | Hoshi | F02D 19/0636 |

FOREIGN PATENT DOCUMENTS

| | | |
|---|---|---|
| EP | 1241338 A2 | 9/2002 |
| EP | 1350941 A1 | 10/2003 |
| EP | 3045702 A1 | 7/2016 |
| FR | 2859763 A1 | 3/2005 |
| JP | H04-334738 A | 11/1992 |
| JP | H11-132076 A | 5/1999 |
| JP | 2001-140689 A | 5/2001 |
| JP | 2001-336436 A | 12/2001 |
| JP | 2003-222047 A | 8/2003 |
| JP | 2004-353460 A | 12/2004 |
| JP | 2005-248721 A | 9/2005 |
| JP | 2006-329110 A | 12/2006 |
| JP | 2008-240532 A | 10/2008 |
| JP | 2009-121255 A | 6/2009 |
| JP | 2012-097652 A | 5/2012 |
| JP | 2014-118873 A | 6/2014 |
| JP | 2015-086763 A | 5/2015 |
| WO | 2015/145228 A1 | 10/2015 |

* cited by examiner

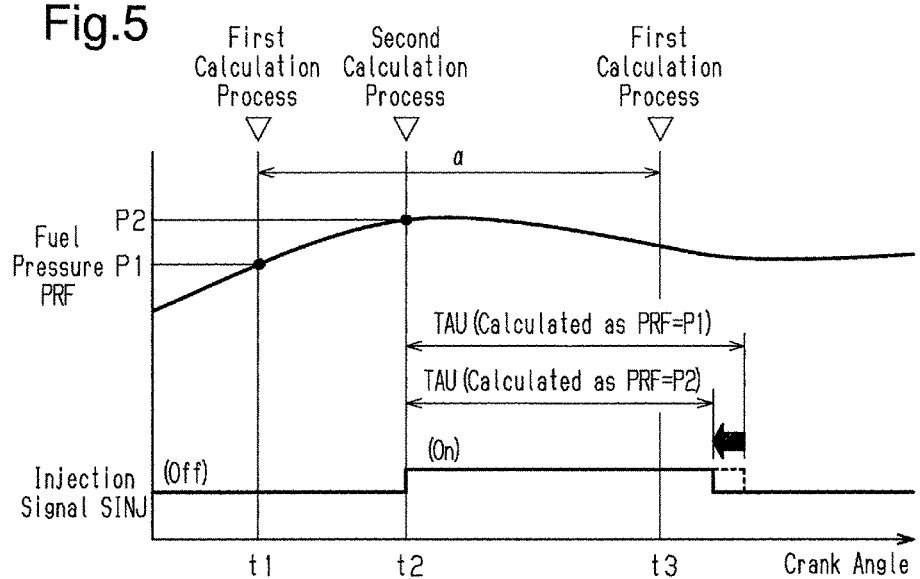
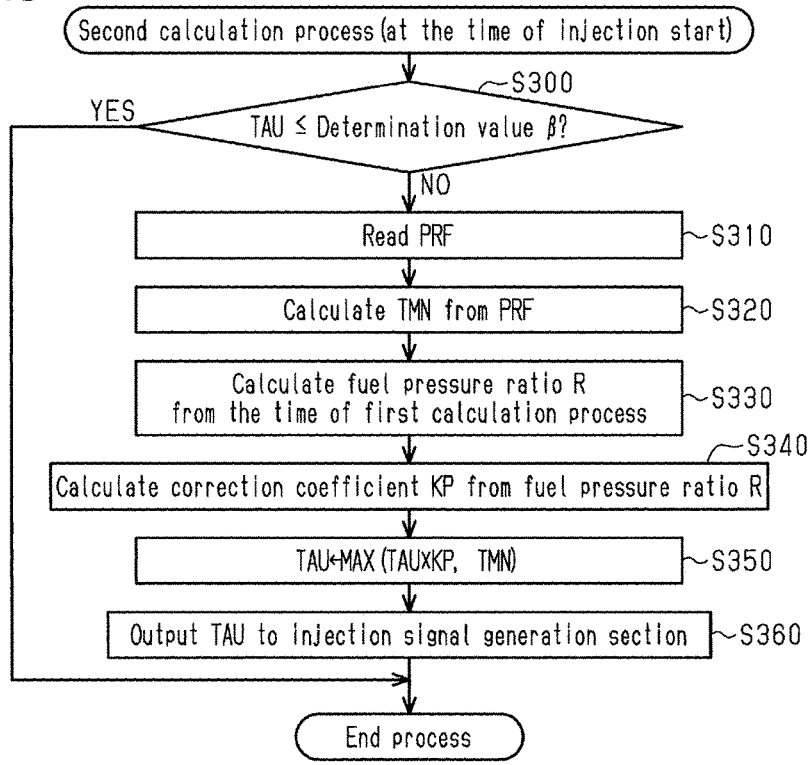

FUEL INJECTION CONTROLLER AND FUEL INJECTION CONTROL METHOD FOR INTERNAL COMBUSTION ENGINE

BACKGROUND OF THE INVENTION

The present invention relates to a fuel injection controller and a fuel injection control method for an internal combustion engine.

In an internal combustion engine mounted on a vehicle, for example, a fuel injection control is performed in the following manner. The control involves calculating a fuel injection amount that is an amount of fuel to be injected from the injector and an injection starting point of time for starting the injection based on the operation state of an internal combustion engine (such as the speed and load of the internal combustion engine). Subsequently, the control involves calculating an injector energization time required for fuel injection of the calculated fuel injection amount as an injection time based on fuel pressure that is the pressure of fuel supplied to the injector. In the control, as a result of the energization being performed for the injection time from the injection starting point of time, the injector performs fuel injection.

The calculation of the injection starting point of time and the injection time is performed prior to the implementation of the fuel injection. Thus, between the point of time for calculating the injection time and a point of time for starting the fuel injection, there is a difference in time to a certain extent. On the other hand, the fuel pressure constantly changes due to factors such as fuel feeding by the fuel pump and pulsation in the fuel supply passage. Therefore, the fuel pressure generated when the fuel injection is actually started may be different from the fuel pressure of the time when the injection time is calculated. In such a case, there may occur an error in the fuel injection amount.

To resolve this, in Japanese Laid-Open Patent Publication No. 2001-336436, a fuel injection controller is disclosed. The fuel injection controller predicts the fuel pressure at the fuel injection point of time based on movements of the detected fuel pressure value up to that point of time and corrects the injection time of the injector based on the predicted fuel pressure.

However, in the above conventional fuel injection controller, when there is an error in the predicted fuel pressure, there also occurs an error in the fuel injection amount corresponding to the error. Thus, there is a limit determined by the accuracy of the prediction of fuel pressure to the improvement of the accuracy for the injection amount of the above conventional fuel injection controller.

SUMMARY OF THE INVENTION

An objective of the present invention is to provide a fuel injection controller and fuel injection control method for an internal combustion engine capable of minimizing an error in a fuel injection amount.

To achieve the foregoing objective, a fuel injection controller for an internal combustion engine is provided that is configured to calculate a fuel injection amount and an injection starting point of time in accordance with an operation state of the internal combustion engine, start energization to an injector at the injection starting point of time, and stop the energization to the injector when an injection time calculated based on the fuel injection amount and a fuel pressure that is a pressure of fuel supplied to the injector elapses from the injection starting point of time. The fuel injection controller includes a first calculation section and a second calculation section. The first calculation section is configured to acquire the fuel pressure at a predetermined point of time before the injection starting point of time and calculate the injection time using the acquired fuel pressure. The second calculation section is configured to acquire the fuel pressure when the injection starting point of time arrives and calculate the injection time using the acquired fuel pressure. The fuel injection controller is configured to: set a point of time to stop the energization to the injector based on a calculation result of the injection time by the first calculation section before starting the energization to the injector; and reset the point of time to stop the energization to the injector based on a calculation result of the injection time by the second calculation section after starting the energization to the injector.

In the above-described fuel injection controller, in addition to the calculation of the injection time at a predetermined point of time before the injection starting point of time, the calculation of the injection time in which the fuel pressure at the time when the injection starting point of time arrives is used is performed again. Thus, it is possible to perform the fuel injection in accordance with the injection time calculated by using the fuel pressure at the start of the fuel injection. As a result, it is possible to minimize an error in a fuel injection amount occurring due to the difference in fuel pressure between the calculation of the injection time and the start of the fuel injection.

When the fuel injection amount is small and the injection time is short, the calculation of the injection time by a second calculation section, which starts along with the fuel injection, may not be completed by the point of time at which the fuel injection should be ended as originally planned. In such a case, at the point of time at which the injection time calculated by the first calculation section, elapses before the fuel injection, the energization to the injector will be stopped.

In the above case, even if the second calculation section calculates the injection time, the calculated value is not actually used for the fuel injection control. Thus, in the above fuel injection controller, when the injection time calculated by the first calculation section is equal to or less than a predetermined value, if the calculation of the injection time by the second calculation section is prohibited, that is, if the calculation is not performed, it is possible, in the above case, to minimize the unnecessary increase in the calculation load by omitting the calculation.

An injection time that ensures the accuracy of an injection amount has a lower limit value. Thus, each of the first calculation section and the second calculation section is preferably configured to calculate the injection time such that the injection time is a value equal to or more than a minimum injection time that is a lower limit value of the injection time. The minimum injection time changes in accordance with the fuel pressure. Thus, in such a case, the first calculation section and the second calculation section are configured to individually calculate the minimum injection time based on the acquired fuel pressure.

When the fuel is supplied to the injector by the fuel pump configured to perform an intermittent fuel feeding, if the fuel feeding by the fuel pump is performed during the fuel injection, the fuel pressure changes, resulting in a deviation of the fuel injection amount. It is possible to prevent the deviation of the fuel injection amount affected by such a fuel feeding by performing a correction in accordance with the presence or absence of the fuel feeding by the fuel pump during the fuel injection by the injector when the injection time is calculated. However, the calculation value of the injection time by the first calculation section includes an error corresponding to the change in fuel pressure from the calculation point of time to the start of the fuel injection. Thus, even when the above correction is applied to the calculation of the injection time by the first calculation section, the accuracy of the injection amount may not be improved. Thus, when the correction is performed in accordance with the presence or absence of the fuel feeding by the fuel pump during the fuel injection by the injector only during the calculation of the injection time by the second calculation section of the calculation of the injection time by the first calculation section and the calculation of the injection time by the second calculation section, it is possible to effectively improve the accuracy of the injection amount while minimizing the increase in the calculation load.

The time from the start of energization to the injector until the injector starts the fuel injection is defined as an ineffective injection time. The time from the start of the fuel injection by the injector until the end of energization is defined as an effective injection time. As a value obtained by totaling the ineffective injection time and the effective injection time, the injection time may be calculated. When the effective injection time is sufficiently long relative to the ineffective injection time, the deviation of the fuel injection amount occurring due to the difference in fuel pressure between during the calculation of the injection time and during the start of the fuel injection occurs mainly due to a deviation in the ineffective injection time due to the difference in fuel pressure. Thus, in such a case, when the first calculation section calculates the ineffective injection time and the effective injection time based on the acquired fuel pressure and calculates, as the injection time, a value obtained by totaling the calculated ineffective injection time and effective injection time, even if the second calculation section calculates the ineffective injection time based on the acquired fuel pressure and calculates, as the injection time, a value obtained by totaling the calculated ineffective injection time and the effective injection time calculated by the first calculation section, it is possible to minimize an error in fuel injection amount. In addition, in this case, in the calculation of the injection time by the second calculation section, only the ineffective injection time may be calculated, out of the effective injection time and the ineffective injection time, and thus, it is possible to minimize the calculation load.

The fuel injection controller may be configured to perform, as a fuel injection by an injector, a partial-lift injection, in which the fuel injection is ended before a nozzle of the injector is fully opened, and a full-lift injection, in which the fuel injection is ended after the nozzle of the injector is fully opened. The calculation of the injection time by the first calculation section and the second calculation section in this case may be performed as follows. That is, the first calculation section is configured to calculate a total injection time by using a fuel pressure acquired when performing the partial-lift injection and calculate a value of the total injection time as an injection time, when performing the partial-lift injection, and to calculate both an effective injection time and an ineffective injection time by using a fuel pressure acquired when performing the full-lift injection and calculate a value obtained by totaling the effective injection time and the ineffective injection time as the injection time, when performing the full-lift injection.

The second calculation section is configured to calculate the total injection time by using the acquired fuel pressure and the value of the total injection time as the injection time when performing the partial-lift injection. The second calculation section is also configured to calculate only the effective injection time, out of the ineffective injection time and the effective injection time, by using the fuel pressure acquired when performing the full-lift injection and calculate, as the injection time, when performing the full-lift injection, the value obtained by totaling the calculated effective injection time and the ineffective injection time calculated by the first calculation section. The ineffective injection time refers to the time from the start of energization to the injector until the start of the fuel injection by the injector, the effective injection time refers to the time from the start of the fuel injection by the injector until the end of the energization, and the total injection time refers to the time from the start of the energization to the injector until the end of the energization.

In such a case, for the partial-lift injection, in which the fuel injection amount is small in the first place and the deviation of the fuel injection amount is relatively large due to the influence of the fuel pressure, a whole of the injection time is recalculated by using the fuel pressure obtained during the start of the fuel injection. On the other hand, for the full-lift injection, in which the ratio of the effective injection time to the ineffective injection time is large, it is possible to ensure the injection amount accuracy simply by correcting the ineffective injection time by using the fuel pressure during the start of the fuel injection. Thus, in the calculation of the injection time by the second calculation section, even if the ineffective injection time only is recalculated and the value of the effective injection time calculated by the first calculation section is used without changes, it is possible to ensure the injection amount accuracy.

To achieve the foregoing objective, a fuel injection control method for an internal combustion engine is provided that is configured to calculate a fuel injection amount and an injection starting point of time in accordance with an operation state of the internal combustion engine, start energization to an injector at the injection starting point of time, and stop the energization to the injector when an injection time calculated based on the fuel injection amount and a fuel pressure that is a pressure of fuel supplied to the injector elapses from the injection starting point of time. The method includes: acquiring the fuel pressure at a predetermined point of time before the injection starting point of time; performing a first calculation of the injection time by using the acquired fuel pressure; acquiring the fuel pressure when the injection starting point of time arrives; performing a second calculation of the injection time by using the acquired fuel pressure; setting a point of time to stop the energization to the injector based on a calculation result of the injection time by the first calculation before starting the energization to the injector; and resetting the point of time to stop the energization to the injector based on a calculation result of the injection time by the second calculation after starting the energization to the injector.

To achieve the foregoing objective, a fuel injection controller for an internal combustion engine is provided that is configured to calculate a fuel injection amount and an injection starting point of time in accordance with an operation state of the internal combustion engine, start energization to an injector at the injection starting point of time, and stop the energization to the injector when an injection time calculated based on the fuel injection amount and a fuel pressure that is a pressure of a fuel supplied to the injector elapses from the injection starting point of time. The fuel injection controller includes circuitry, which is configured to execute: acquiring the fuel pressure at a predetermined point of time before the injection starting point of time; performing a first calculation of the injection time by using the acquired fuel pressure; acquiring the fuel pressure when the injection starting point of time arrives; performing a second calculation of the injection time by using the acquired fuel pressure; setting a point of time to stop the energization to the injector, based on a calculation result of the injection time by the first calculation before starting the energization to the injector; and resetting a point of time to stop the energization to the injector, based on a calculation result of the injection time by the second calculation after starting the energization to the injector.

Other aspects and advantages of the present invention will become apparent from the following description, taken in conjunction with the accompanying drawings, illustrating by way of example the principles of the invention.

BRIEF DESCRIPTION OF THE DRAWINGS

The invention, together with objects and advantages thereof, may best be understood by reference to the following description of the presently preferred embodiments together with the accompanying drawings in which:

FIG. 5 is a time chart illustrating a control manner of the fuel injection controller;

FIG. 6 is a flowchart of a second calculation process executed by a second calculation section provided in a fuel injection controller according to a second embodiment;

DESCRIPTION OF THE PREFERRED EMBODIMENTS

First Embodiment

A fuel injection controller for an internal combustion engine according to a first embodiment will be described with reference to FIGS. 1 to 5.

First, the configuration of an internal combustion engine 10 to which a fuel injection controller according to the present embodiment is applied will be described.

Figure 1:
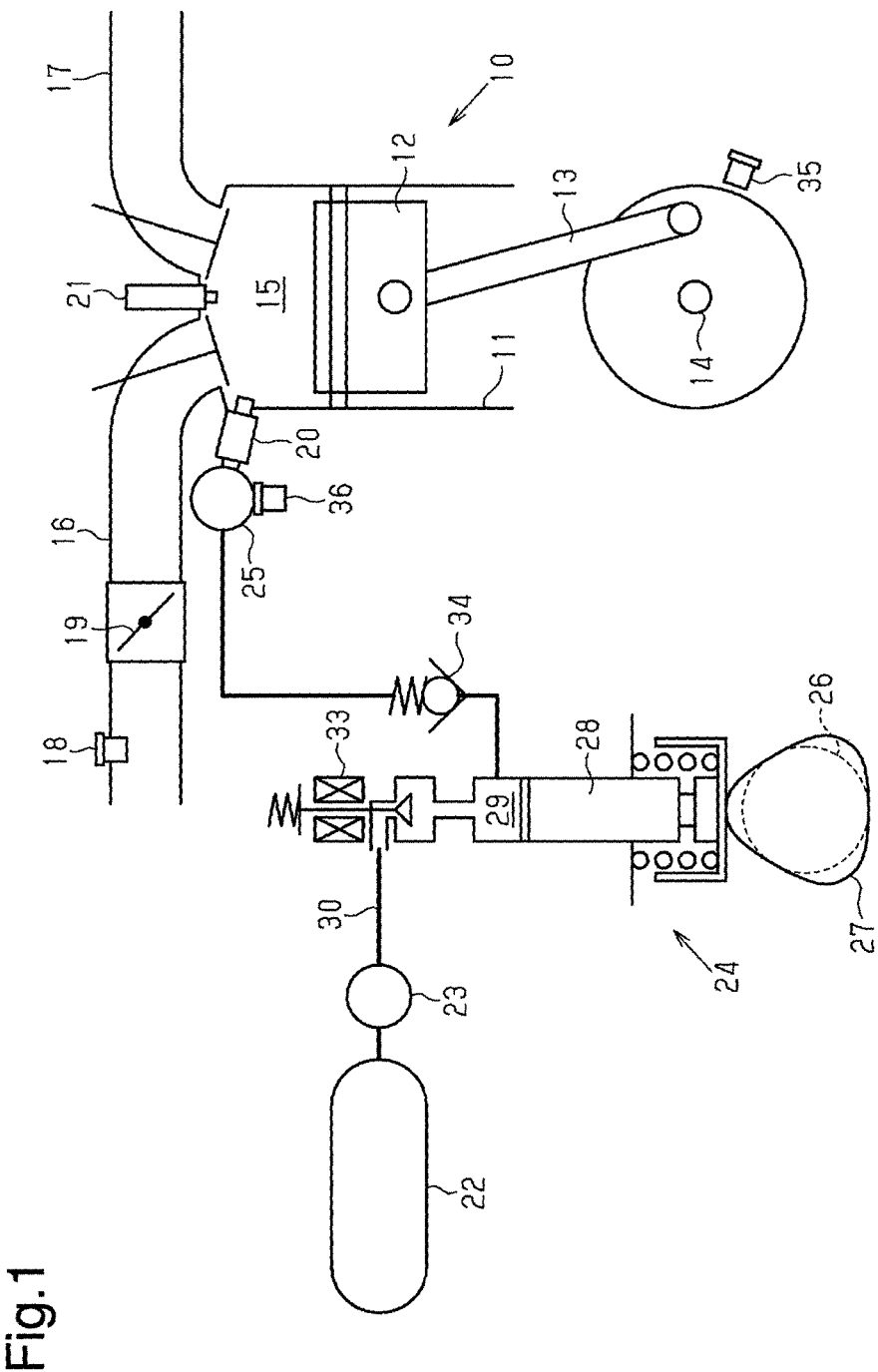
FIG. 1 is a diagram schematically illustrating the configuration of an internal combustion engine to which a fuel injection controller according to a first embodiment is applied.

As illustrated in FIG. 1, the internal combustion engine 10 includes a cylinder 11 and a piston 12 arranged to reciprocate within the cylinder 11. The piston 12 is connected to a crankshaft 14, which is the output shaft of the internal combustion engine 10, via a connecting rod 13 configured to convert the reciprocating movement of the piston 12 into a rotating movement.

Inside the cylinder 11, a combustion chamber 15 is defined by the piston 12. To the combustion chamber 15, an intake passage 16 that is a passage for intake of air flowing into the combustion chamber 15 and an exhaust passage 17 that is a passage for exhaust of air discharged from the combustion chamber 15 are connected. In the intake passage 16, an air flowmeter 18 is arranged, which is configured to detect the flow rate of air intake (intake air amount GA) within the intake passage 16. Further, in the intake passage 16, a throttle valve 19 is arranged, which is a valve for regulating the intake air amount GA. In the combustion chamber 15, an injector 20 is arranged, which is configured to inject fuel into the combustion chamber 15. In the combustion chamber 15, an ignition plug 21 is arranged, which is configured to ignite the fuel injected by the injector 20 by way of spark discharge.

Next, the configuration of the fuel system of the internal combustion engine 10 will be described. The fuel system configured to supply fuel to the injector 20 in the internal combustion engine 10 includes a feed pump 23 configured to pump up fuel from a fuel tank 22, a high-pressure fuel pump 24 configured to pressurize and discharge the fuel pumped up by the feed pump 23, and a delivery pipe 25 configured to store a high-pressure fuel discharged by the high-pressure fuel pump 24. The high-pressure fuel pump 24 includes a plunger 28 configured to be moved in a reciprocating manner by a cam 27 arranged on a camshaft 26 of the internal combustion engine 10, and a pressurizing chamber 29 configured to change in volume in accordance with the reciprocating movement of the plunger 28. The pressurizing chamber 29 is connected to the feed pump 23 via a low-pressure fuel passage 30. In the high-pressure fuel pump 24, a solenoid spill valve 33 is arranged, which is configured to block the passage of the fuel between the pressurizing chamber 29 and the low-pressure fuel passage 30 in accordance with energization. The pressurizing chamber 29 of the high-pressure fuel pump 24 is connected to the delivery pipe 25 via a check valve 34. The check valve 34 allows for fuel discharge from the pressurizing chamber 29 to the delivery pipe 25 and prohibits backward flow of the fuel from the delivery pipe 25 to the pressurizing chamber 29.

In the high-pressure fuel pump 24 thus configured, when the plunger 28 moves in a direction to expand the volume of the pressurizing chamber 29, the solenoid spill valve 33 is opened. As a result, the fuel in the low-pressure fuel passage 30 is suctioned into the pressurizing chamber 29. Then, when the plunger 28 moves in a direction to reduce the volume of the pressurizing chamber 29, the solenoid spill valve 33 is closed. As a result, the fuel suctioned into the pressurizing chamber 29 is pressurized and discharged into the delivery pipe 25. In the thus configured high-pressure fuel pump 24, when the ratio of the period during which the solenoid spill valve 33 is closed to the period during which the plunger 28 moves in the direction to reduce the volume of the pressurizing chamber 29 is changed, it is possible to adjust the amount of fuel discharged into the delivery pipe 25.

In the internal combustion engine 10, a crank angle sensor 35 is arranged, which is configured to output a pulse signal (hereinafter, a crank signal CRNK) having a pulse width corresponding to rotation of a predetermined angle of the crankshaft 14, in accordance with rotation of the crankshaft 14. Further, in the internal combustion engine 10, a fuel pressure sensor 36 is arranged, which is configured to detect the pressure of fuel (hereinafter fuel pressure PRF) in the delivery pipe 25, supplied to the injector 20.

In the thus configured internal combustion engine 10, the fuel injection controller according to the present embodiment performs fuel injection control through the control of the injector 20.

Figure 2:
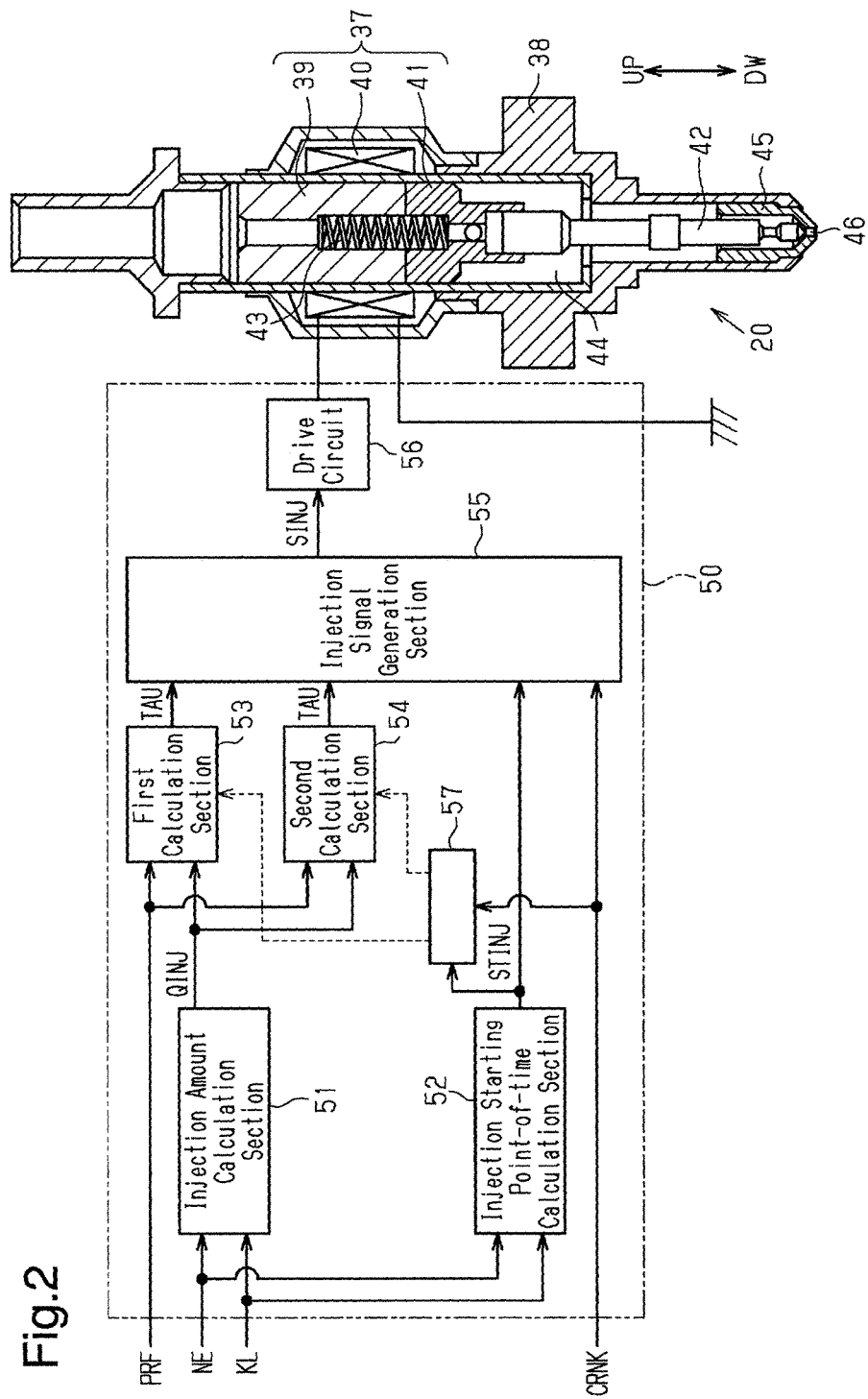
FIG. 2 is a diagram illustrating the configuration of the fuel injection controller, together with a cross-sectional structure of an injector to be controlled by the fuel injection controller.

As illustrated in FIG. 2, the injector 20 incorporates an electromagnetic solenoid 37. The electromagnetic solenoid 37 is arranged inside a housing 38 of the injector 20 and includes a fixed core 39, an electromagnetic coil 40, and a movable core 41. The fixed core 39 is fixed in the housing 38 and magnetized in response to energization to the electromagnetic coil 40 arranged around the fixed core 39. The movable core 41 is arranged adjacently to the fixed core 39 inside the housing 38 to reciprocate in a direction indicated by arrow UP and arrow DW in FIG. 2. The movable core 41 is connected to a needle valve 42 to be displaced together with the needle valve 42. Further, inside the housing 38, a spring 43 is arranged, which is configured to constantly urge the movable core 41 in a direction away from the fixed core 39 (direction indicated by arrow DW). Inside the housing 38, a fuel chamber 44 is provided, into which the fuel from the delivery pipe 25 is introduced.

A nozzle body 45 is attached to the distal end portion of the housing 38 to surround the distal end portion of the needle valve 42. The distal end portion of the housing 38 refers to an end portion located on the side indicated by arrow DW. The distal end of the nozzle body 45 is provided with a slit-shaped injection hole 46, through which the inside and outside of the nozzle body 45 communicates. In the injector 20, the distal end of the needle valve 42 can be displaced within a range from a fully closed position to contact, that is, to sit on the nozzle body 45 to a fully opened position at which the movable core 41 contacts the fixed core 39. The needle valve 42, the nozzle body 45, and the injection hole 46 configure the nozzle of the injector 20. The fuel introduced into the fuel chamber 44 of the injector 20 is injected from the injection hole 46 after passing through the opening of the nozzle between the nozzle body 45 and the needle valve 42 when the needle valve 42 leaves the nozzle body 45.

In the injector 20 thus configured, when the energization to the electromagnetic coil 40 is started, the electromagnetic solenoid 37 is excited. Thus, the movable core 41 is drawn to the magnetized fixed core 39. As a result, the distal end of the needle valve 42 leaves (is lifted from) the nozzle body 45. When the nozzle of the injector 20 is opened in this way, the fuel in the fuel chamber 44 is injected to the outside through the injection hole 46. When the energization to the electromagnetic coil 40 is then stopped, the fixed core 39 is demagnetized. Thus, by the urging force of the spring 43, the movable core 41 is separated from the fixed core 39. As a result, when the needle valve 42 sits on the nozzle body 45 after being displaced to the fully closed position, the communication between the injection hole 46 and the fuel chamber 44 is blocked, resulting in the fuel injection being stopped.

In the following description, the displacement amount of the needle valve 42 from the fully closed position is referred to as a nozzle lift amount. Further, the nozzle lift amount achieved when the needle valve 42 reaches the fully opened position is referred to as a fully opened lift amount MAX.

In a fuel injection controller 50 according to the present embodiment, the point of time at which the energization to the electromagnetic solenoid 37 of the injector 20 is started and the period during which the energization is performed are controlled to control the starting point of time of the fuel injection and the fuel injection amount from the injector 20. As illustrated in FIG. 2, the fuel injection controller 50 includes an injection amount calculation section 51, an injection starting point-of-time calculation section 52, a first calculation section 53, a second calculation section 54, an injection signal generation section 55, a drive circuit 56, and a call section 57.

The injection amount calculation section 51 receives an engine rotation speed NE, which is the rotation speed of the internal combustion engine 10, and an engine load KL, which is the magnitude of the load of the internal combustion engine 10, and based thereon, and calculates and outputs a fuel injection amount QINJ, which is the amount of fuel injected from the injector 20. During the operation of the internal combustion engine 10, the injection amount calculation section 51 repeatedly executes a calculation process of the fuel injection amount QINJ as a regular task at specified intervals. The engine rotation speed NE is acquired through calculation of the pulse width of the crank signal CRNK output from the crank angle sensor 35. Further, the engine load KL is acquired through calculation based on the engine rotation speed NE and the intake air amount GA detected by the air flowmeter 18.

The injection starting point-of-time calculation section 52 receives the engine rotation speed NE and the engine load KL and calculates and outputs an injection starting point of time STINJ, which is a point of time at which the fuel injection by the injector 20 is started, based on the engine rotation speed NE and the engine load KL. During the operation of the internal combustion engine 10, the injection starting point-of-time calculation section 52 repeatedly executes a calculation process of such an injection starting point of time STINJ, as a regular task at specified time intervals. The injection starting point of time STINJ is calculated as a value indicating a starting point of time of the fuel injection from a change amount of a rotation phase (crank angle) of the crankshaft 14 from an intake top dead center.

The first calculation section 53 and the second calculation section 54 both receive the fuel injection amount QINJ and the fuel pressure PRF, and calculate and output an energization time of the electromagnetic solenoid 37 of the injector 20 needed for the fuel injection of the fuel injection amount QINJ, as an injection time TAU. As described later, the first calculation section 53 and the second calculation section 54 are configured to implement the calculation of the injection time TAU at a different point of time.

The injection signal generation section 55 receives the injection starting point of time STINJ calculated by the injection starting point-of-time calculation section 52, and the injection time TAU calculated by the first calculation section 53 and the second calculation section 54, and the crank signal CRNK and based on these parameters, generates and outputs an injection signal SINJ of the injector 20. Specifically, the injection signal generation section 55 stores the value of the received injection starting point of time STINJ and the value of the received injection time TAU. The injection signal generation section 55 starts outputting the injection signal SINJ when a point of time indicated by the stored value of the injection starting point of time STINJ arrives. Then, the injection signal generation section 55 continues outputting the injection signal SINJ until the time indicated by the stored value of the injection time TAU elapses, and at the time when the time has elapsed, stops outputting the injection signal SINJ.

The drive circuit 56 receives the injection signal SINJ output by the injection signal generation section 55, and based on the received injection signal SINJ, performs energization to the electromagnetic solenoid 37 of the injector 20. Specifically, the drive circuit 56 starts receiving the injection signal SINJ and starts the energization to the electromagnetic solenoid 37 at the same time. The drive circuit 56 continues the energization to the electromagnetic solenoid 37 while continuing to receive the injection signal SINJ, and stops the energization when stopping receiving the injection signal SINJ.

The call section 57 receives the injection starting point of time STINJ and the crank signal CRNK calculated by the injection starting point-of-time calculation section 52. The call section 57 calls the first calculation section 53 and the second calculation section 54 when the point of time arrives at which each of the first calculation section 53 and the second calculation section 54 executes a process of calculating the injection time TAU. Specifically, the call section 57 calls the first calculation section 53 each time the rotation phase of the crankshaft 14 (crank angle) acquired from the crank signal CRNK changes by a predetermined angle $\alpha$. Further, the call section 57 calls the second calculation section 54 upon arrival of the point of time indicated by the value of the injection starting point of time STINJ calculated by the injection starting point-of-time calculation section 52.

Next, a first calculation process executed by the first calculation section 53 will be described.

Figure 3:
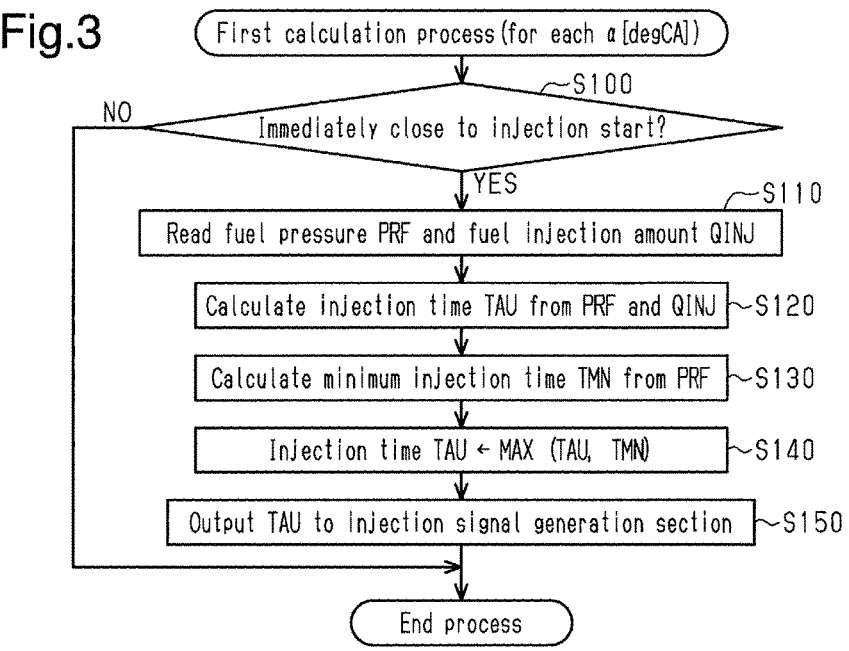
FIG. 3 is a flowchart of a first calculation process executed by a first calculation section provided in the fuel injection controller.

FIG. 3 illustrates processing procedures of the first calculation section 53 in the first calculation process. The first calculation section 53 is configured to execute the first calculation process when being called by the call section 57. That is, the first calculation section 53 executes the first calculation process each time the crank angle changes by the predetermined angle $\alpha$.

Upon the start of this process, first, in step S100, the first calculation section 53 determines whether the current process is performed at a point of time immediately close to the start of the injection. That is, the first calculation section 53 determines whether, out of execution point of times of the current process repeatedly executed each time the crank angle changes by the predetermined angle $\alpha$, the execution point of time of the current process this time is the latest execution point of time before the injection starting point of time STINJ. Specifically, the determination is performed based on whether the injection starting point of time STINJ calculated by the injection starting point-of-time calculation section 52 is kept within the predetermined angle $\alpha$ relative to the current crank angle.

Upon a negative determination in step S100 (S100: NO), the first calculation section 53 ends this process without changes. In contrast, upon a positive determination in step S100 (S100: YES), the first calculation section 53 advances the process to step S110. When the process is advanced to step S110, in step S110, the first calculation section 53 reads the fuel pressure PRF and the fuel injection amount QINJ. Then, in subsequent step S120, the first calculation section 53 calculates the injection time TAU from the read fuel pressure PRF and fuel injection amount QINJ. The value of the injection time TAU is calculated, as an energization time of the electromagnetic solenoid 37 needed for injection of fuel with the fuel injection amount QINJ, under the current fuel pressure PRF.

In subsequent step S130, the first calculation section 53 calculates a minimum injection time TMN based on the fuel pressure PRF read in step S110. The value of the minimum injection time TMN is calculated as a lower limit value of the injection time TAU, in which an error in fuel injection amount is kept within an allowable range, such that the higher the fuel pressure PRF, the greater the value of the minimum injection time TMN becomes. In subsequent step S140, the first calculation section 53 performs a lower limit guard process of the injection time TAU by the minimum injection time TMN. That is, in step S140, when the value of the injection time TAU is less than that of the minimum injection time TMN, the first calculation section 53 performs a process of replacing the value of the injection time TAU by that of the minimum injection time TMN. Next, in step S150, the first calculation section 53 ends this process after outputting the value of the injection time TAU calculated in the current process to the injection signal generation section 55.

The expression Z←MAX (X, Y) in FIG. 3 and the flowcharts discussed below, in which the three variables X, Y, and Z are generalized, that indicates that the larger value of the two values of X and Y is selected as the value of Z.

In the first calculation process, at a point of time that is closest to the injection starting point of time STINJ yet before the injection starting point of time STINJ, out of execution point of times of the current process repeatedly executed each time the crank angle changes by the predetermined angle $\alpha$, a detected value of the fuel pressure PRF at that point of time is used to calculate the injection time TAU. That is, the first calculation section 53 is configured to acquire the fuel pressure PRF at a predetermined point of time before the start of the fuel injection and calculate the injection time TAU by using the acquired fuel pressure PRF.

Next, a second calculation process executed by the second calculation section 54 will be described. The second calculation section 54 is configured to execute the second calculation process when being called by the call section 57. That is, the second calculation section 54 executes the second calculation process when a point of time arrives that is indicated by the value of the injection starting point of time STINJ calculated by the injection starting point-of-time calculation section 52, that is, at the time of the start of the fuel injection.

Figure 4:
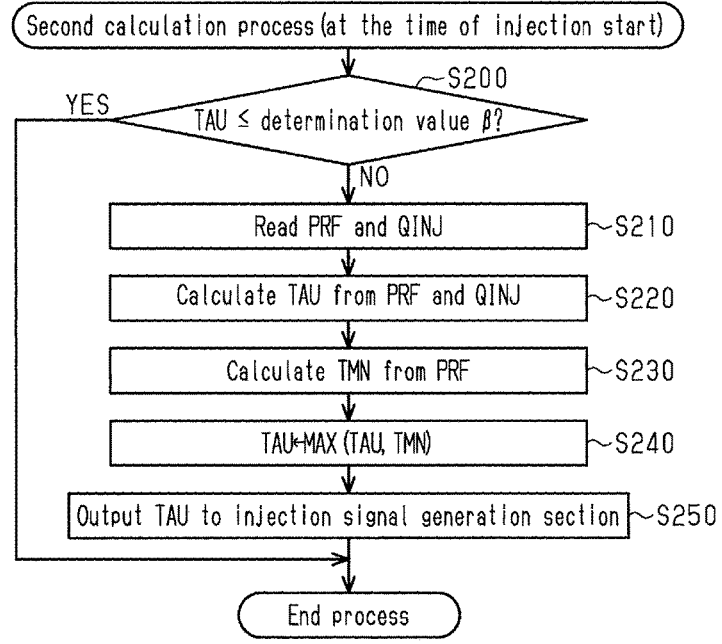
FIG. 4 is a flowchart of a second calculation process executed by a second calculation section provided in the fuel injection controller.

FIG. 4 illustrates a processing procedure of the second calculation section 54 in the second calculation process. In the injection signal generation section 55 during the start of the fuel injection on which this process is executed, a value calculated by the first calculation section 53 is stored as the injection time TAU. That is, the injection signal generation section 55 at this time starts outputting the injection signal SINJ assuming that the first calculation section 53 stops outputting at a point of time at which the injection time TAU calculated by the first calculation section 53 elapses.

When this process is started, first, in step S200, the second calculation section 54 determines whether the value of the injection time TAU stored in the injection signal generation section 55 is equal to or less than a predetermined determination value $\beta$. As described above, in the injection signal generation section 55 at this time, the value of the injection time TAU calculated by the first calculation section 53 is stored. Then, when the value of the injection time TAU is equal to or less than the determination value β (YES), the second calculation section 54 ends the current process without changes. To the determination value β, an assumed value of a time required for calculating the injection time TAU in the second calculation process is set.

In contrast, when the value of the injection time TAU calculated by the first calculation section 53 exceeds the determination value β (S200: NO), the second calculation section 54 advances the process to step S210. Subsequent to step S210 in this process, the second calculation section 54 performs a process in similar way as in the process subsequent to step S110 of the first calculation process. That is, in step S210, the second calculation section 54 reads the fuel pressure PRF and the fuel injection amount QINJ and calculates the injection time TAU based on the fuel pressure PRF and the fuel injection amount QINJ in step S220. Further, in step S230, the second calculation section 54 calculates the minimum injection time TMN from the read fuel pressure PRF, and performs a lower limit guard process of the injection time TAU by the minimum injection time TMN in step S240. Next, in step S250, the second calculation section 54 outputs the value of the calculated injection time TAU to the injection signal generation section 55.

In the second calculation process, when the calculation value of the injection time TAU in the first calculation process is larger than the determination value β, the injection time TAU is recalculated by using a newly acquired fuel pressure PRF. Next, the value of the injection time TAU stored in the injection signal generation section 55 is rewritten from the value calculated in the first calculation process to the value recalculated in the second calculation process.

Operation and Advantages

Subsequently, an operation and advantages of the fuel injection controller 50 thus configured will be described.

FIG. 5 illustrates an example of a control manner of the fuel injection controller 50. As described above, the first calculation section 53 executes the first calculation process after being called by the call section 57 each time the crank angle changes by the predetermined angle α. As illustrated in FIG. 5, the first calculation section 53 is called at a point of time t1 and a point of time t3. The injection starting point of time STINJ at this time is set at a point of time t2 between the point of time t1 and the point of time t3. Thus, at this time, at the point of time t1, which is the execution point of time of the first calculation process before the injection starting point of time STINJ and immediately close to the injection starting point of time STINJ, the injection time TAU is calculated. At this time, the fuel pressure PRF (PRF=P1) at the point of time t1 is used to calculate the injection time TAU.

As described above, the first calculation process is performed only each time the crank angle changes by the specified angle α. Thus, during a period since the first calculation section 53 calculates the injection time TAU until the fuel injection is started, the fuel pressure PRF may change. As illustrated in FIG. 5, during this period, the fuel pressure PRF changes from P1 to P2. Thus, when the value of the injection time TAU calculated at the point of time t1 by the first calculation section 53 is used to execute the fuel injection without changes, a deviation of the fuel injection amount due to a difference in fuel pressure PRF between a calculation point of time (point of time t1) of the injection time TAU and the injection starting point of time STINJ occurs. Even if such a deviation of the fuel injection amount is very small, the deviation may have an impact that cannot be ignored on the learning result of the air-fuel ratio.

In this regard, in the fuel injection controller 50 of the present embodiment, at the point of time t2, which is the injection starting point of time STINJ, recalculation of the injection time TAU is performed by the second calculation section 54. At this time, the fuel pressure PRF (PRF=P2) at the point of time t2 is used to calculate the injection time TAU. As illustrated in FIG. 5, the value of the injection time TAU recalculated at the point of time t2 by the second calculation section 54 is shorter than the value of the injection time TAU calculated at the point of time t1 by the first calculation section 53.

Thus, in the present embodiment, it is possible to set the injection time TAU in accordance with the fuel pressure PRF (PRF=P2) at the time of the start of the fuel injection. Therefore, it is possible to minimize an error in fuel injection amount due to a difference in fuel pressure PRF between when the injection time TAU is calculated and when the fuel injection is actually performed.

Further, each of the first calculation section 53 and the second calculation section 54 is configured to calculate the value of the injection time TAU to become equal to or more than the minimum injection time TMN. As described above, the minimum injection time TMN, which is the lower limit value of the injection time TAU in which the error in fuel injection amount is kept within an allowable range, changes in value by the fuel pressure PRF. Thus, the second calculation section 54 recalculates the value of the minimum injection time TMN during recalculation of the injection time TAU at the injection starting point of time.

When the fuel injection amount QINJ is small and the fuel injection is ended in a short period of time, the calculation of the injection time TAU by the second calculation section 54 performed from the start of the fuel injection may not be completed by the completion of the fuel injection. From when the calculation of the injection time TAU is ended by the second calculation section 54 until the value obtained therefrom is output to the injection signal generation section 55, the value calculated by the first calculation section 53 as the injection time TAU is stored in the injection signal generation section 55. Thus, in such a case, the fuel injection is performed by the injection time TAU calculated by the first calculation section 53. At that time, even when the second calculation section 54 calculates the injection time TAU, the calculated value is not actually used for the fuel injection control.

In this regard, in the present embodiment, depending on whether the value of the injection time TAU calculated by the first calculation section 53 is equal to or less than the determination value β, it is determined whether the calculation of the injection time TAU by the second calculation section 54 is necessary or not. That is, in the present embodiment, it is predicted whether it is possible to complete the calculation of the injection time TAU by the second calculation section 54 by the end of the fuel injection from the value of the injection time TAU calculated by the first calculation section 53. When it is predicted that the completion is not possible, the calculation of the injection time TAU by the second calculation section 54 is prohibited, that is, the calculation of the injection time TAU is not performed from the outset, so as to minimize the increase in the calculation load that would be otherwise generated.

Second Embodiment

Next, a second embodiment of the fuel injection controller will be described in detail with reference to FIGS. 6 and 7. In the present embodiment and each of the embodiments described later, configurations common to that described above are assigned the same reference numerals to omit detailed descriptions.

In the first embodiment, the calculation of the injection time TAU by the second calculation section 54 at the time of the start of the fuel injection is performed in substantially a similar way as in the calculation of the injection time TAU by the first calculation section 53. In order to ensure the accuracy for the injection amount, upon calculation of the injection time TAU, in addition to the fuel pressure PRF, a complicated calculation process is needed while taking into consideration factors such as individual differences in the injection characteristic of the injector 20 and the influence of the remaining magnetic force of the electromagnetic solenoid 37 from the previous injection. Thus, if the calculation of the injection time TAU is performed twice for each fuel injection in a similar way, then the calculation load required for the calculation of the injection time TAU is doubled. In this regard, in the present embodiment, when the second calculation process executed by the second calculation section 54 is modified as below, it is possible to minimize the increase in the calculation load generated by recalculation.

FIG. 6 illustrates a processing procedure of the second calculation process in the present embodiment. Similar to the first embodiment, the second calculation section 54 is configured to execute the second calculation process at the time of the start of the fuel injection. The first calculation process executed by the first calculation section 53 is the same as that in the first embodiment.

When the present process is started, first, in step S300, the second calculation section 54 determines whether the value of the injection time TAU calculated in the first calculation process by the first calculation section 53 is equal to or less than the determination value β. Next, when the value of the injection time TAU is equal to or less than the determination value β (YES), the second calculation section 54 ends the current second calculation process without changes. When the value of the injection time TAU exceeds the determination value β (NO), the second calculation section 54 advances the process to step S310.

When the process is advanced to step S310, in step S310, the second calculation section 54 reads the fuel pressure PRF of this time. In subsequent step S320, the second calculation section 54 calculates the minimum injection time TMN, based on the read fuel pressure PRF.

Subsequently, in step S330, the second calculation section 54 calculates a fuel pressure ratio R. At this time, the value of the fuel pressure ratio R is calculated as the ratio of the current fuel pressure PRF to the fuel pressure PRF obtained when the injection time TAU is calculated in the first calculation process. Then, in subsequent step S340, the second calculation section 54 calculates a correction coefficient KP based on the fuel pressure ratio R. The correction coefficient KP is a correction value for the injection time TAU calculated by the first calculation section 53 for absorbing a deviation of the fuel injection amount due to a change in the fuel pressure PRF from the time of the calculation to the injection starting point of time STINJ, and is calculated as a value as described below.

Consideration will now be given to adjustment of the injection time TAU such that the fuel injection amount does not change with respect to the change in the fuel pressure PRF. In the above step S340, the second calculation section 54 calculates the value of the correction coefficient KP such that the ratio of the adjusted injection time TAU to the injection time TAU to be adjusted is the value of the correction coefficient KP in a state in which the fuel pressure ratio R denotes the ratio of the changed fuel pressure PRF to the fuel pressure PRF to be changed at this time. The relationship between the fuel pressure ratio R and the correction coefficient KP is determined by the injection characteristic of the injector 20, and the relationship can be previously determined through experiments.

Figure 7:
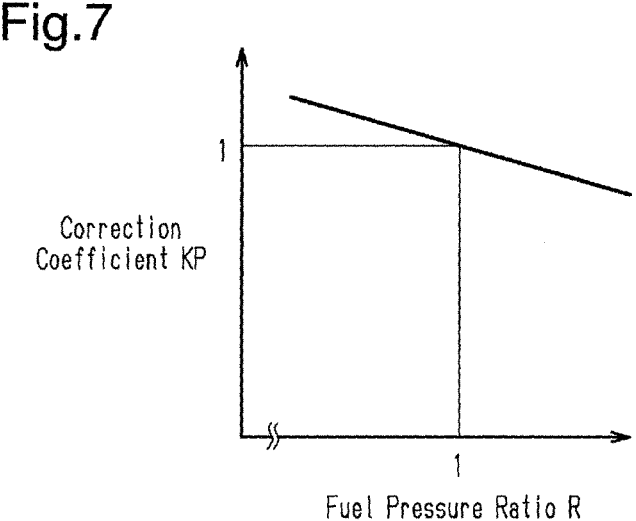
FIG. 7 is a graph illustrating the relationship between the value of a correction coefficient and a fuel pressure ratio set in the second calculation process.

FIG. 7 illustrates the relationship between the fuel pressure ratio R and the correction coefficient KP in a state in which an injector is provided that has an injection characteristic in which a fuel injection amount per unit time is in proportion to the fuel pressure PRF. In this case, the value of the correction coefficient KP is smaller in accordance with an increase in the fuel pressure ratio R. In an injector having an injection characteristic different from this case, the relationship between the fuel pressure ratio R and the correction coefficient KP is also different. However, when there is no change in fuel pressure PRF, it is possible to hold the fuel injection amount without the need for changing the injection time TAU. Thus, irrespective of the injection characteristic of the injector, the value of the correction coefficient KP is 1 when the fuel pressure ratio R is 1.

After calculation of the correction coefficient KP in the above step S340, the second calculation section 54 advances the process to step S350. In step S350, the second calculation section 54 calculates, as a calculation value of the injection time TAU in the current second calculation process, a value obtained by performing a lower limit guard process by the minimum injection time TMN calculated in step S320 on the product (TAU×KP) obtained by multiplication of the value of the injection time TAU calculated by the first calculation section 53 by the correction coefficient KP. Next, in subsequent step S360, the second calculation section 54 ends the current process after outputting the calculation value of the injection time TAU to the injection signal generation section 55.

Operation and Advantages

It is possible to acquire from the injection characteristic of the injector 20, a correction amount of the injection time TAU needed to maintain the fuel injection amount with respect to the change in fuel pressure PRF between the time of calculation of the injection time TAU of the first calculation section 53 and the injection starting point of time STINJ. Therefore, in the present embodiment, the second calculation section 54 is configured to correct the value of the injection time TAU calculated by the first calculation section 53 by using the correction coefficient KP calculated based on the ratio (fuel pressure ratio R) of the fuel pressure PRF of the injection starting point of time STINJ to the fuel pressure PRF at the time of the calculation of the injection time TAU of the first calculation section 53 to recalculate the injection time TAU. In such a case, it is possible to more easily recalculate the injection time TAU at the time of the start of the fuel injection, and it is also possible to minimize the increase in the calculation load caused due to the recalculation.

Third Embodiment

Next, a third embodiment of the fuel injection controller will be described in detail with reference to FIGS. 8 and 9.

As described above, in the internal combustion engine 10 illustrated in FIG. 1, the fuel is supplied to the injector 20 through intermittent fuel feeding by the high-pressure fuel pump 24 according to the plunger 28 moving up and down. When the fuel feeding by the high-pressure fuel pump 24 described above is performed during the fuel injection by the injector 20, the fuel pressure PRF is changed, resulting in a change in the fuel injection amount.

Figure 8:
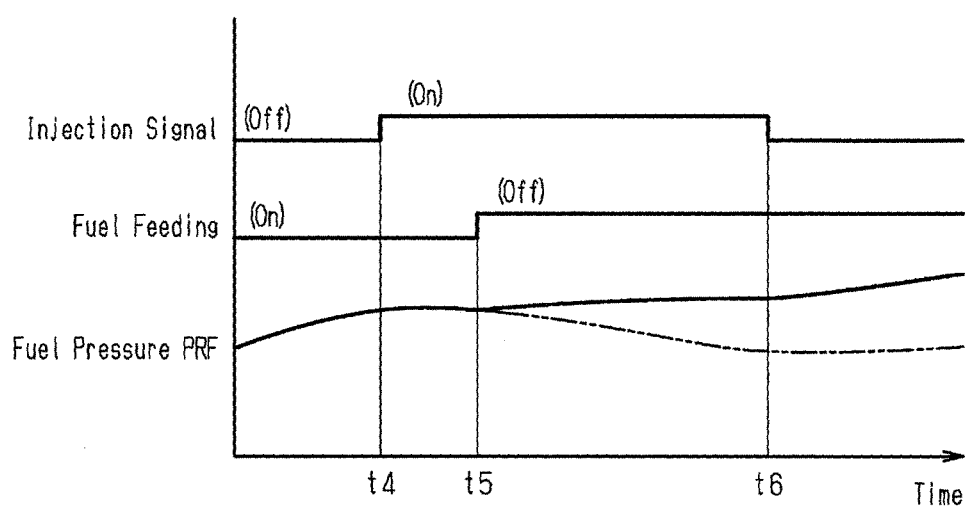
FIG. 8 is a time chart illustrating movements of fuel pressure before and after fuel injection when fuel feeding is performed during the fuel injection and when the fuel feeding is not performed during the fuel injection.

FIG. 8 illustrates movements of the fuel pressure PRF when the fuel feeding is performed during the fuel injection with a solid line. FIG. 8 illustrates movements of the fuel pressure PRF when the fuel feeding is not performed with a long dashed short dashed line. In FIG. 8, during the period from a point of time t4 to a point of time t6, an injection signal is output and the fuel injection is implemented. When the fuel feeding by the high-pressure fuel pump 24 is started at a point of time t5 during such fuel injection, the subsequent fuel pressure PRF is higher than that in a case where the fuel feeding is not performed. Thus, even when the fuel pressure PRF is the same in the injection time TAU and at the time of the start of the fuel injection, if the fuel feeding is performed during the fuel injection, then the fuel injection amount is larger than that in a case where the fuel feeding is not performed. In this regard, in the present embodiment, the second calculation process executed by the second calculation section 54 is changed as below. It is thus possible to minimize a deviation of the fuel injection amount due to the fuel feeding during the fuel injection.

Figure 9:
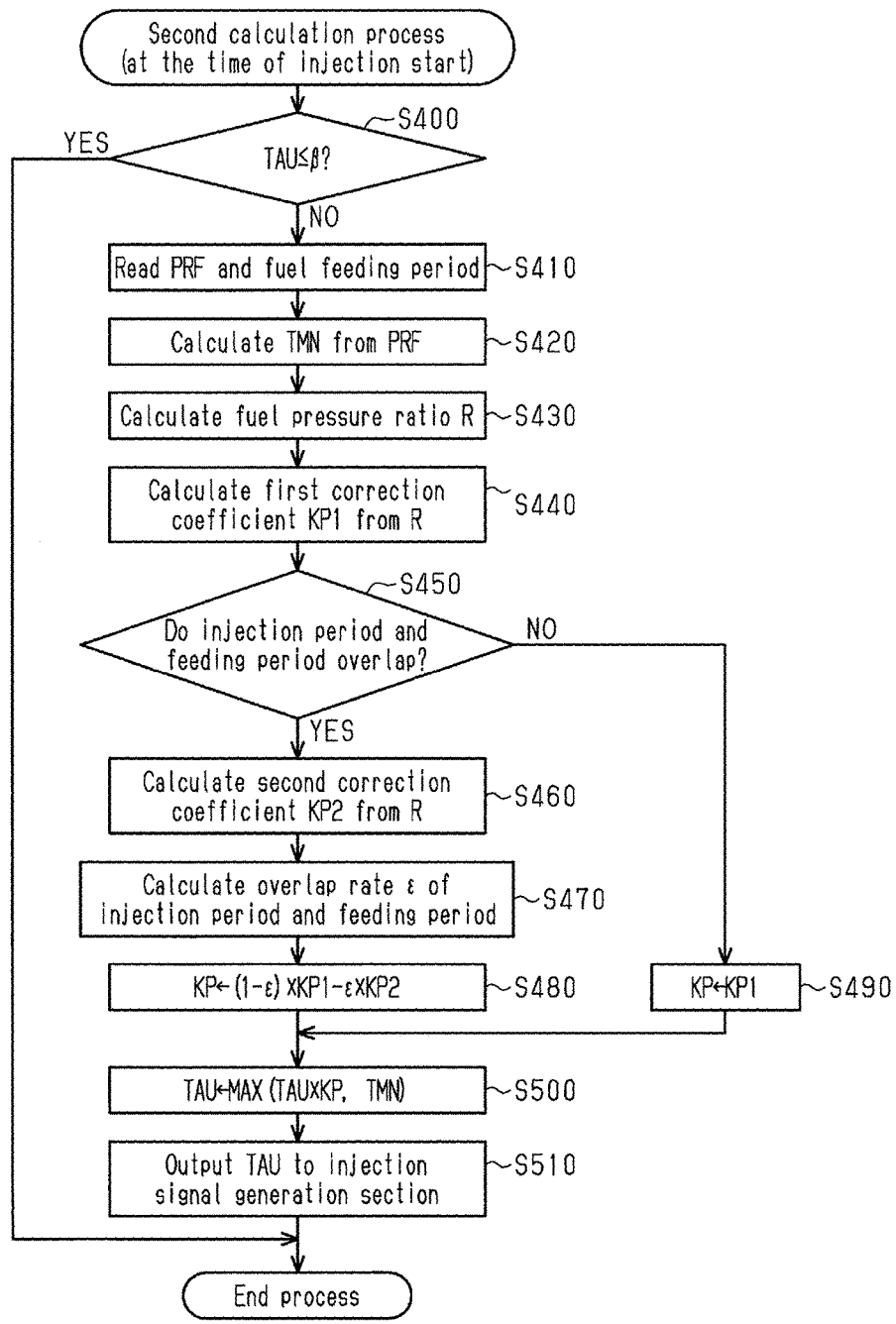
FIG. 9 is a flowchart of the second calculation process executed by the second calculation section in a fuel injection controller according to a third embodiment.

FIG. 9 illustrates a processing procedure of the second calculation process in the present embodiment. Similar to the first and second embodiments, the second calculation section 54 is configured to execute the second calculation process when the injection starting point of time STINJ arrives. The first calculation process executed by the first calculation section 53 is the same as that in the first embodiment.

When the present process is started, first, in step S400, the second calculation section 54 determines whether the value of the injection time TAU calculated in the first calculation process by the first calculation section 53 is equal to or less than the determination value β. Next, when the value of the injection time TAU is equal to or less than the determination value β (YES), the second calculation section 54 ends the current second calculation process without changes. When the value of the injection time TAU exceeds the determination value β (NO), the second calculation section 54 advances the process to step S410.

When the process is advanced to step S410, in step S410, the second calculation section 54 reads the fuel pressure PRF at that time and the period during which the high-pressure fuel pump 24 performs the fuel feeding (hereinafter, referred to as a feeding period). The feeding period is acquired from the energization period of the solenoid spill valve 33 of the high-pressure fuel pump 24.

Next, in step S420, the second calculation section 54 calculates the minimum injection time TMN based on the read fuel pressure PRF. Next, in subsequent step S430, the second calculation section 54 calculates the fuel pressure ratio R in similar way as in step S330 of the second calculation process in the second embodiment.

In subsequent step S440, the second calculation section 54 calculates a first correction coefficient KP1 based on the fuel pressure ratio R. The first correction coefficient KP1 is calculated as a value of the correction coefficient KP obtained when the fuel feeding by the high-pressure fuel pump 24 is not performed during the fuel injection.

Next, in step S450, the second calculation section 54 determines whether the injection period of the injector 20 and the feeding period of the high-pressure fuel pump 24 overlap. For the determination, the second calculation section 54 uses the injection period when the fuel injection is performed based on the injection time TAU calculated by the first calculation section 53.

When it is determined that the injection period and the feeding period do not overlap (S450: NO), in step S490, the second calculation section 54 advances the process to step S500 after setting that value of the first correction coefficient KP1 as that of the correction coefficient KP.

In contrast, when it is determined that the injection period and the feeding period overlap (S450: YES), in step S460, the second calculation section 54 calculates a second correction coefficient KP2 based on the fuel pressure ratio R. The second correction coefficient KP2 is calculated as a value of the correction coefficient KP obtained when the fuel feeding by the high-pressure fuel pump 24 is performed over the injection period. The value of the second correction coefficient KP2 thus calculated is smaller than the value of the first correction coefficient KP1 obtained when the value of the fuel pressure ratio R is the same. In this case, in subsequent step S470, the second calculation section 54 calculates an overlap rate ∈ between the injection period and the feeding period. The overlap rate ∈ is the ratio of the period during which the fuel feeding is performed during the injection period to the entire injection period.

Next, in subsequent step S480, the second calculation section 54 calculates the value of the correction coefficient KP such that the relationship of the following equation is established with respect to the first correction coefficient KP1, the second correction coefficient KP2, and the overlap rate ∈:

$$KP \leftarrow (1-\in) \times KP1 - \in \times KP2$$

That is, when the overlap rate ∈ changes from 0 to 1, the value of the correction coefficient KP is calculated such that the value changes from the value of the first correction coefficient KP1 in the fuel pressure ratio R at that time to the value of the second correction coefficient KP2 in the fuel pressure ratio R in accordance with the change in the overlap rate ∈. Next, after the calculation, the second calculation section 54 advances the process to step S500.

When the process is advanced to step S500, in step S500, the second calculation section 54 calculates, as a calculation value of the injection time TAU in the current second calculation process, a value obtained by performing a lower limit guard process by the minimum injection time TMN calculated in step S420 on a product (TAU×KP) obtained by multiplication of the value of the injection time TAU calculated by the first calculation section 53 by the correction coefficient KP. Next, in subsequent step S510, the second calculation section 54 ends the current process after outputting the value of the injection time TAU to the injection signal generation section 55.

In the second calculation process, when the fuel feeding by the high-pressure fuel pump 24 is performed during the fuel injection by the injector 20, the value of the correction coefficient KP is calculated as a value by which correction in accordance with the change in the fuel pressure PRF from the time of the calculation of the injection time TAU of the first calculation section 53 until the start of the fuel injection, and correction in accordance with the change in the fuel pressure PRF caused due to the fuel feeding during the fuel injection are performed. In contrast, when the fuel feeding by the high-pressure fuel pump 24 is not performed during the fuel injection by the injector 20, the value of the correction coefficient KP is calculated as the value by which only the correction in accordance with the change in the fuel pressure PRF from the calculation of the injection time TAU until the start of the fuel injection is performed, out of the two corrections described above. Thus, the second calculation section 54 of the fuel injection controller according to the present embodiment is configured to calculate the injection time TAU after performing the correction in accordance with the presence or absence of the fuel feeding by the high-pressure fuel pump 24 during the fuel injection by the injector 20.

Operation and Advantages

In the present embodiment, the second calculation section 54 calculates the injection time TAU such that the time is shorter than that in a case where the fuel feeding is not performed when the fuel feeding by the high-pressure fuel pump 24 is performed during the fuel injection. Further, when the fuel feeding is performed during the fuel injection, the second calculation section 54 calculates the injection time TAU such that the greater the overlap rate ∈ between the injection period and the feeding period, the shorter the injection time TAU becomes. Thus, the injection time TAU is set as the value on which the change in the fuel pressure PRF by the fuel feeding during the fuel injection is reflected. As a result, the control accuracy for the injection amount is improved.

In the present embodiment, out of the calculation of the injection time TAU by the first calculation section 53 and that by the second calculation section 54, only during calculation of the injection time TAU by the second calculation section 54, the correction in accordance with the presence or absence of the fuel feeding by the high-pressure fuel pump 24 during the fuel injection by the injector 20 is performed. This is because of the following reasons.

The calculation value of the injection time TAU by the first calculation section 53 includes an error due to the change in the fuel pressure PRF from the time of the calculation until the start of the fuel injection. Further, a situation where the injection time TAU calculated by the first calculation section 53 is used for the actual fuel injection control without changes is limited. Thus, even when the influence of the fuel feeding during the fuel injection is reflected on the calculation of the injection time TAU by the first calculation section 53, it may not be possible to obtain an improvement effect in the accuracy for the injection amount to offset the increase in the calculation load resulting from that calculation. Thus, in the present embodiment, when the correction in accordance with the presence or absence of the fuel feeding is performed only during the calculation of the injection time TAU of the second calculation section 54, the accuracy for the injection amount is effectively improved while minimizing the increase in the calculation load.

Fourth Embodiment

Next, a fourth embodiment of the fuel injection controller will be described in detail with reference to FIG. 10 to FIG. 12.

As a technology for highly accurately performing a fuel injection by a very small amount, a partial-lift injection technology is known. First, the partial-lift injection technology will be described in the present embodiment.

Figure 10:
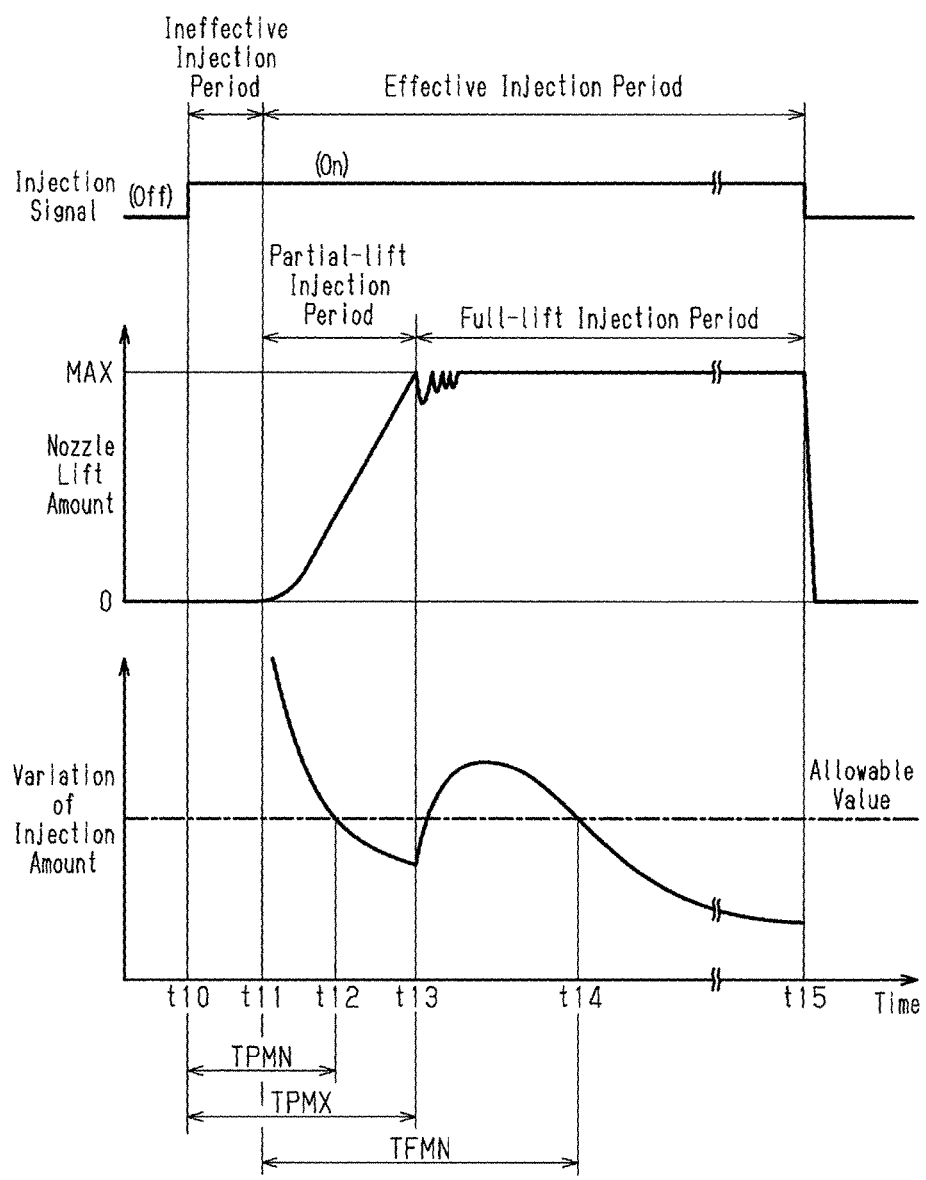
FIG. 10 is a time chart illustrating movements of variation in the nozzle lift amount and the fuel injection amount of the injector during fuel injection.

FIG. 10 illustrates movements of variation in the nozzle lift amount and the injection amount of an injector 20 during fuel injection. The variation in the injection amount in FIG. 10 represents the distribution relative to the total amount of fuel injected by the injector 20 up to that point of time at each point of time in the time axis in FIG. 10. Behavior of the injector 20 during the fuel injection will be described below with reference to FIG. 2.

When the output of the injection signal SINJ is started at a point of time t10 in FIG. 10, the energization to the electromagnetic solenoid 37 by the injector 20 is started As a result, the electromagnetic solenoid 37 is excited. In the injector 20, the needle valve 42, which sits on the nozzle body 45, receives a pressing force in a direction in which the needle valve 42 is closed by the spring 43 and the pressure of the fuel in the fuel chamber 44. Further, the electromagnetic solenoid 37 is not capable of immediately generating a magnetic force strong enough to resist the pressing force even if the energization is started. Thus, during the period from the point of time t10, at which the injection signal SINJ is turned on, to a point of time t11 subsequent thereto, the nozzle lift amount remains at 0.

At the point of time t11, the magnetic force generated by the electromagnetic solenoid 37 becomes sufficiently strong to lift the needle valve 42 from the nozzle body 45 against the pressing force, and thus the fuel injection from the injection hole 46 is started.

The nozzle lift amount is kept at the fully opened lift amount MAX as long as the nozzle lift amount increases to reach the fully opened lift amount MAX so that the energization to the electromagnetic solenoid 37 is continued. Next, when the output of the injection signal SINJ is stopped and the energization is thus stopped at a point of time t15, the electromagnetic solenoid 37 is demagnetized. Then, in response to the demagnetization, the movable core 41 is displaced by the urging force of the spring 43 in a direction away from the fixed core 39. As a result, when the needle valve 42 sits on the nozzle body 45, the injection hole 46 is closed, resulting in the end of the fuel injection.

In the output period of the injection signal SINJ at this time, a non-injection period from the point of time t10, at which the output of the injection signal SINJ is started, to the point of time t11, at which the fuel injection is started, is defined as an ineffective injection period, and the time of that period is defined as an ineffective injection time T0. Further, the period from the point of time t11, at which the fuel injection is started, to the point of time t15, at which the output of the injection signal SINJ is stopped, is defined as an effective injection period, and the time of that period is defined as an effective injection time INJT. Moreover, in the effective injection period, the period from the start of the effective injection period (point of time t11) to the point of time t13, at which the nozzle lift amount reaches the fully opened lift amount MAX, is defined as a partial-lift injection period, and a period subsequent to the point of time t13 is defined as a full-lift injection period.

The length of the ineffective injection period (ineffective injection time T0) varies from time to time depending on the variation in the fuel pressure PRF and the excitation condition of the electromagnetic solenoid 37. Even when there is a slight variation in the ineffective injection time T0 resulting therefrom, a great variation is generated to the fuel injection amount immediately after the start of the lifting of the needle valve 42. However, when the fuel injection amount increases along with the elapse of time, the amount of deviation of the fuel injection amount generated by the variation in the ineffective injection time T0 becomes relatively smaller with respect to the total amount of the fuel injection. Thus, the variation in the fuel injection amount in the partial lift period is significantly large at the point of time t11, at which the fuel injection is started. However, the variation gradually decreases along with the elapse of time. In a period subsequent to the point of time t12 in the partial lift period, the variation in the fuel injection amount is equal to or less than the allowable value.

The needle valve 42 reaches the fully opened position when displaced until the movable core 41 contacts the fixed core 39, and a rebound resulting from this contacting at this time generates a bounce movement to the needle valve 42. Thus, immediately after the point of time t13, at which the nozzle lift amount reaches the fully opened lift amount MAX, the nozzle lift amount pulsates around the fully opened lift amount MAX. The amplitude of the pulsation of the nozzle lift amount caused by such a bounce movement of the needle valve 42 or a period thereof changes from time to time. Thus, the variation in the fuel injection amount in the full lift period becomes once large immediately after the point of time t13, at which this period starts. Also in this case, when the fuel injection amount increases along with the elapse of time, the amount of deviation of the fuel injection amount generated by the variation in the ineffective injection time T0 or the amount of deviation of the fuel injection amount generated by a bounce movement becomes relatively smaller with respect to the total amount of the fuel injection amount. In the period subsequent to the point of time t14 in the full-lift injection period, the variation in the fuel injection amount is equal to or less than the allowable value.

Thus, in each of both the partial-lift injection period and the full-lift injection period, there is a period during which the variation in the fuel injection amount can be kept to the allowable value or less (injection available period). In the partial-lift injection period, the period from the start of the output of an injection signal (t10) to the point of time (t12), at which the variation in the fuel injection amount is equal to or less than the allowable value, is referred to as a PL minimum injection time TPMN below. An injection time that is the upper limit of the partial-lift injection period, that is, an injection time at which the nozzle of the injector 20 is fully opened after the needle valve 42 reaches the fully opened position, is referred to as a PL maximum injection time TPMX. A time from the start of the effective injection period (t11) to the point of time (t14), at which the variation in the fuel injection amount is equal to or less than the allowable value after the start of the full-lift injection period, is referred to as an FL minimum injection time TFMN. The PL minimum injection time TPMN, the PL maximum injection time TPMX, and the FL minimum injection time TFMN are not constant values, but variable by the fuel pressure PRF.

In the conventional fuel injection control, only the injection available period of the full-lift injection period is used to perform the fuel injection. A technology enabling a highly accurate injection by fuel of a very small amount by also using the injection available period of the partial-lift injection period is a partial-lift injection technology. A fuel injection in which an end period of the fuel injection is set to the injection available period of the partial-lift injection period, that is, a fuel injection in which the fuel injection is ended before the nozzle of the injector 20 is fully opened, is referred to as a partial-lift injection below. Further, a fuel injection in which an end period of the fuel injection is set to the injection available period of the full-lift injection period, that is, a fuel injection in which the fuel injection is ended after the nozzle of the injector 20 is fully opened, is referred to as a full-lift injection.

The fuel injection controller of the present embodiment is configured to perform the fuel injection by selectively using the partial-lift injection and the full-lift injection, depending on the amount of fuel to be injected. Each of the first calculation section 53 and the second calculation section 54 is configured to calculate the injection time TAU differently depending on a case where the partial-lift injection is performed and a case where the full-lift injection is performed.

Figure 11:
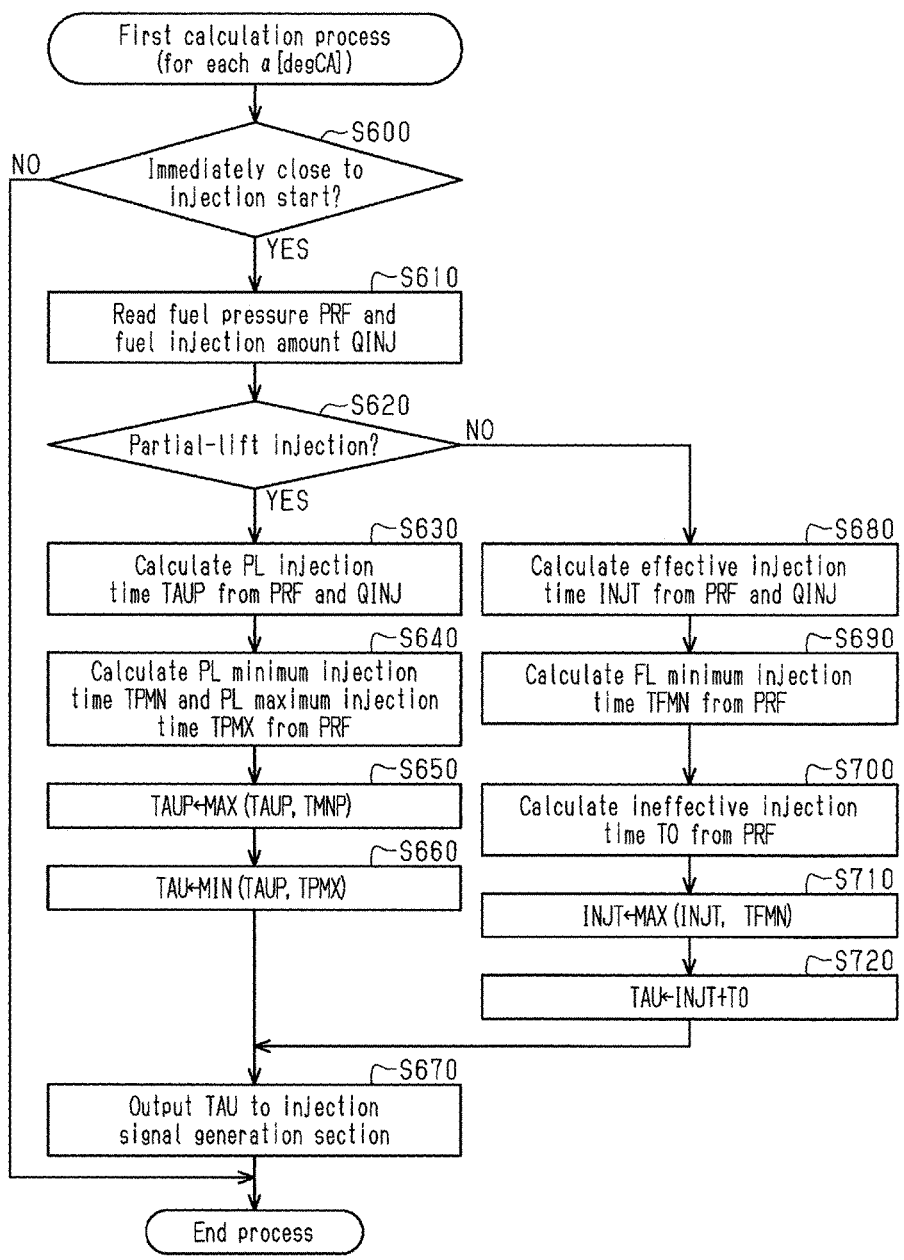
FIG. 11 is a flowchart of the first calculation process executed by the first calculation section provided in a fuel injection controller according to a fourth embodiment.

FIG. 11 illustrates a processing procedure of the first calculation process in the fuel injection controller of the present embodiment. The first calculation process in the present embodiment is also a process executed by the first calculation section 53 in response to the calling by the call section 57 each time the crank angle changes by predetermined angle α.

Upon a start of the present process, first, in step S600, the first calculation section 53 determines whether the current process is performed at a point of time immediately close to the start of the injection. Next, upon a negative determination in step S600 (S600: NO), the first calculation section 53 ends the current process without changes. Upon a positive determination in step S600 (S600: YES), the first calculation section 53 advances the process to step S610.

When the process is advanced to step S610, in that step S610, the first calculation section 53 reads the fuel pressure PRF and the fuel injection amount QINJ. Next, in subsequent step S620, the first calculation section 53 determines whether the fuel injection this time is performed as the partial-lift injection or the full-lift injection. The determination is performed based on whether the fuel injection amount QINJ is equal to or less than a partial lift maximum injection amount previously specified as the upper limit value of the fuel injection amount in the partial injection.

When the fuel injection this time is performed as the partial-lift injection (S620: YES), the first calculation section 53 advances the process to step S630. Next, in step S630, the first calculation section 53 calculates, as the value of a PL injection time TAUP, the injection time needed to perform the fuel injection of the fuel injection amount QINJ under the fuel pressure PRF based on the fuel pressure PRF and the fuel injection amount QINJ. Further, in subsequent step S640, the first calculation section 53 calculates the above-described PL minimum injection time TPMN and PL maximum injection time TPMX based on the fuel pressure PRF. In next step S650, the first calculation section 53 performs the lower limit guard process on the PL injection time TAUP by the PL minimum injection time TPMN. In subsequent step S660, the first calculation section 53 sets the value of the injection time TAU to the smaller value of the PL injection time TAUP and the PL maximum injection time TPMX. Further, in step S670, the first calculation section 53 ends the present process after outputting the value of the injection time TAU to the injection signal generation section 55.

In contrast, when the fuel injection this time is performed as the full-lift injection (S620: NO), the first calculation section 53 advances the process to step S680. In step S680, the first calculation section 53 calculates the effective injection time INJT based on the fuel pressure PRF and the fuel injection amount QINJ. In subsequent step S690, the first calculation section 53 calculates the FL minimum injection time TFMN based on the fuel pressure PRF. Further, in subsequent step S700, the first calculation section 53 calculates the ineffective injection time T0 based on the fuel pressure PRF. Next, in step S710, the first calculation section 53 performs a lower limit guard process of the effective injection time INJT by the FL minimum injection time TFMN. Next, in step S720, the value obtained by totaling the value of the effective injection time INJT, on which the lower limit guard process has been performed, and the value of the ineffective injection time T0 is calculated as the value of the injection time TAU. Subsequently, in step S670, the first calculation section 53 ends the current process after outputting the calculated value of the injection time TAU to the injection signal generation section 55.

Figure 12:
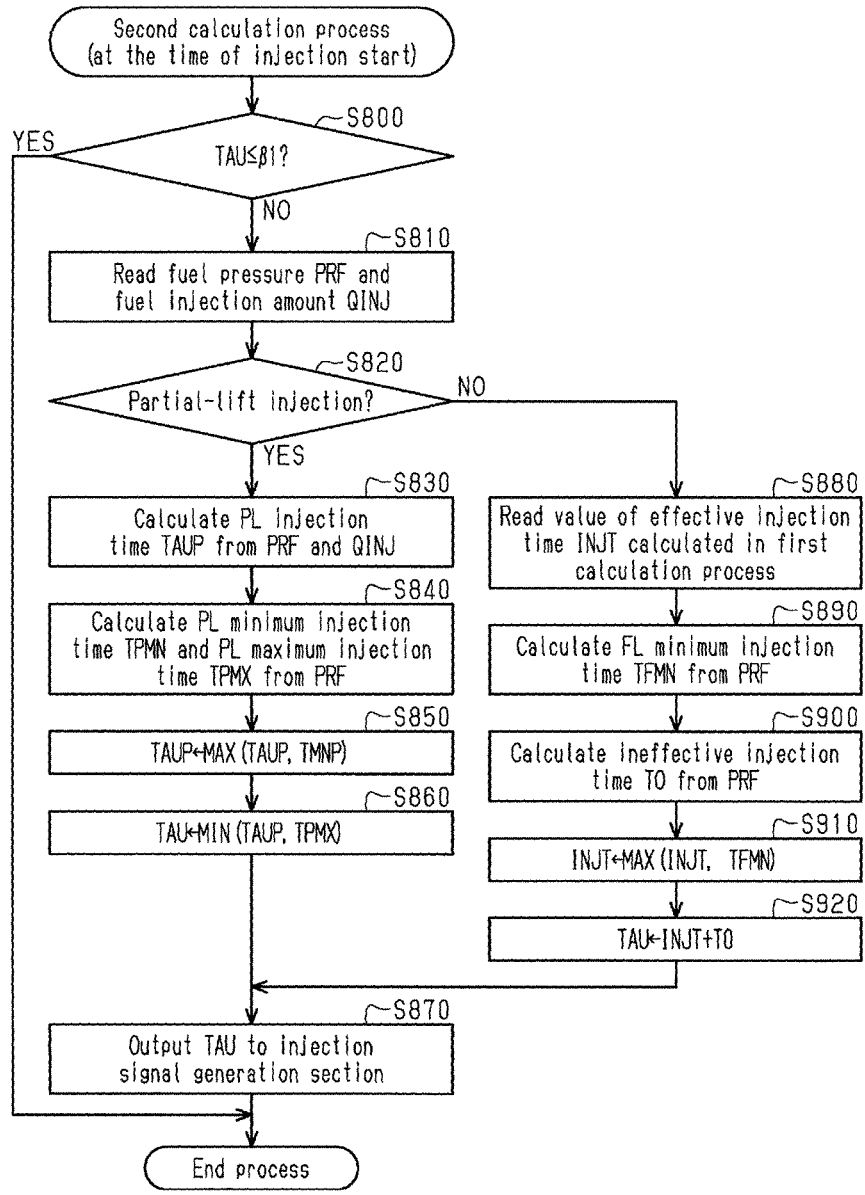
FIG. 12 is a flowchart of the second calculation process executed by the second calculation section provided in the fuel injection controller.

FIG. 12 illustrates a processing procedure of the second calculation process in the fuel injection controller of the present embodiment. The second calculation process in the present embodiment is also a process executed by the second calculation section 54 in response to the calling by the call section 57 when the injection starting point of time STINJ arrives.

When the present process is started, first, in step S800, the second calculation section 54 determines whether the value of the injection time TAU calculated in the first calculation process by the first calculation section 53 is equal to or less than the determination value β. Next, when the value of the injection time TAU is equal to or less than the determination value β (YES), the second calculation section 54 ends the current second calculation process without changes. When the value of the injection time TAU exceeds the determination value β (NO), the second calculation section 54 advances the process to step S810.

When the process is advanced to step S810, in that step S810, the second calculation section 54 reads the fuel pressure PRF and the fuel injection amount QINJ. Next, in subsequent step S820, the second calculation section 54 determines whether the fuel injection this time is performed as the partial-lift injection or the full-lift injection.

When the fuel injection this time is performed as the partial-lift injection (S820: YES), the second calculation section 54 advances the process to step S830. Then, in step S830, the second calculation section 54 calculates the PL injection time TAUP based on the fuel pressure PRF and the fuel injection amount QINJ. Further, in subsequent step S840, the second calculation section 54 calculates the above-described PL minimum injection time TPMN and PL maximum injection time TPMX based on the fuel pressure PRF. In next step S850, the second calculation section 54 performs the lower limit guard process on the PL injection time TAUP by the PL minimum injection time TPMN. In subsequent step S860, the second calculation section 54 sets the value of the injection time TAU to the smaller value of the PL injection time TAUP and the PL maximum injection time TPMX. Further, in step S870, the second calculation section 54 ends the current process after outputting the value of the injection time TAU to the injection signal generation section 55. The calculation mode of the injection time TAU in this case is the same as the calculation mode in a case of the partial-lift injection in the first calculation process.

In contrast, when the fuel injection this time is performed as the full-lift injection (S820: NO), the second calculation section 54 advances the process to step S880. When the process is advanced to step S880, in step S880, the second calculation section 54 reads the value of the effective injection time INJT calculated in step S680 of the first calculation process by the first calculation section 53. Next, in subsequent step S890, the second calculation section 54 calculates the FL minimum injection time TFMN based on the fuel pressure PRF. Further, in subsequent step S900, the second calculation section 54 calculates the ineffective injection time T0 based on the fuel pressure PRF. Next, in step S910, the second calculation section 54 performs a lower limit guard process of the effective injection time INJT by the FL minimum injection time TFMN. Next, in step S920, the second calculation section 54 calculates, as the value of the injection time TAU, a value obtained by totaling the value of the effective injection time INJT, on which the lower limit guard process has been performed, and the value of the ineffective injection time T0. Subsequently, in step S870, the second calculation section 54 ends the current process after outputting the calculated value of the injection time TAU to the injection signal generation section 55.

The drive circuit 56 includes a capacitor configured to excite the electromagnetic solenoid 37 upon the start of energization to the electromagnetic solenoid 37. The ineffective injection time T0 also changes depending on a charging state of the capacitor when starting the energization. Further, in a case where there is only a short time interval from the end of the last fuel injection to the start of the fuel injection this time (injection interval), the electromagnetic solenoid 37 may not be completely demagnetized. In that case, the ineffective injection time T0 is shortened. Thus, in the calculation of the ineffective injection time T0 in step S700 of the first calculation process and step S900 of the second calculation process, a charge correction based on a charging amount of the capacitor and a correction based on the injection interval are performed on the value calculated from the fuel pressure PRF to determine the value of the ineffective injection time T0.

Operation and Advantages

In the partial-lift injection, it is difficult to divide the ineffective injection period and the effective injection period. Thus, the first calculation section 53 does not individually calculate the ineffective injection time T0 and the effective injection time INJT at the time of the partial-lift injection, but calculates a time from the start of the energization to the injector 20 to the end thereof (total injection time) as the PL injection time TAUP. Further, the first calculation section 53 calculates, as the injection time TAU, the value obtained by performing the lower limit guard process on the calculation value of the PL injection time TAUP.

As described above, the lifting of the needle valve 42 is performed against the pressure of the fuel in the fuel chamber 44, that is, the fuel pressure PRF. Thus, the fuel pressure PRF significantly affects the ineffective injection time T0. Further, the fuel pressure PRF also significantly affects the lift speed of the needle valve 42 in the partial-lift injection period after the fuel injection is started. Thus, in the partial-lift injection, in which the ratio of the ineffective injection period to the entire injection period is large and the fuel injection is ended during the lifting of the needle valve 42, a difference in fuel pressure PRF between during the calculation of the injection time TAU and during the start of the fuel injection significantly affects the accuracy for the injection amount.

Thus, in the present embodiment, at the time of the partial injection, the second calculation section 54 is configured to recalculate the PL injection time TAUP being the total injection time by using the fuel pressure PRF at the time of the start of the fuel injection. Further, the second calculation section 54 calculates, as the injection time TAU, a value obtained by performing the lower limit guard process on the calculation value of the PL injection time TAUP.

In contrast, the first calculation section 53 individually calculates the ineffective injection time T0 and the effective injection time INJT at the time of the full-lift injection, and calculates the injection time TAU as a value obtained by totaling these times. In the full-lift injection, when the time estimated as the ineffective injection time T0 differs from the actual time, the time in which the fuel injection is actually performed, that is, the effective injection time INJT, changes by that difference. Thus, in the full-lift injection, when there is a difference in fuel pressure PRF between the time of the calculation of the injection time TAU and the time of the start of the fuel injection, a deviation occurs in the fuel injection amount by the change in the ineffective injection time T0 generated as a result of the difference. In contrast, the fuel pressure PRF also affects the injection rate of the injector 20 in the effective injection period (fuel injection amount per unit time). However, the opening area of the nozzle of the injector 20 is very small even at the time of the full opening of the nozzle, and even when there is a slight difference in the fuel pressure PRF, the flow rate of the fuel injected through the opening of the nozzle will not significantly change. Thus, in the full-lift injection, the deviation of fuel injection amount caused by the difference in the fuel pressure PRF between the time of the calculation of the injection time TAU and the time of the start of the fuel injection results mainly from the change in the ineffective injection time T0 by the fuel pressure PRF.

Thus, in the present embodiment, the second calculation section 54 during the full-lift injection does not recalculate the effective injection time INJT, but recalculates the ineffective injection time T0 only by using the fuel pressure PRF at the time of the start of the fuel injection. Next, the second calculation section 54 calculates the injection time TAU as a value obtained by totaling the effective injection time INJT calculated by the first calculation section 53 and the recalculated ineffective injection time T0.

Thus, the fuel injection controller of the present embodiment is configured to acquire the fuel pressure PRF when the injection starting point of time STINJ arrives and completely recalculate the injection time TAU by using the acquired fuel pressure PRF, at the time of the partial-lift injection in which the fuel pressure PRF greatly affects the accuracy for the injection amount compared to the time of the full-lift injection. In this regard, the fuel injection controller is configured to recalculate the ineffective injection time T0 only at the time of the full-lift injection by using the fuel pressure PRF acquired at the injection starting point of time STINJ. That is, at the time of the full-lift injection, in the effective injection time INJT in which the fuel pressure PRF affects only slightly the accuracy for the injection amount, the recalculation by using the fuel pressure PRF acquired during the injection starting point of time STINJ is omitted. Thus, it is possible to effectively improve the accuracy for the injection amount while minimizing an increase in the calculation load.

The above embodiments may be modified as follows.

The fuel injection controller according to the fourth embodiment may be modified as follows to be applied to an internal combustion engine configured to perform the full-lift injection only. That is, in the first calculation process of FIG. 11, the determination of step S620 and the processes of step S630 to step S660 executed in a case of the partial-lift injection are omitted. In that case, after step S610, the process is always advanced to step S680. Further, in the second calculation process of FIG. 12, the determination of step S820 and the processes of step S830 to step S860 executed in a case of the partial-lift injection are omitted. In that case, after step S810, the process is always advanced to step S880. Also in this case, in the second calculation process at the time of the start of the fuel injection, only the ineffective injection time T0, out of the effective injection time INJT and the ineffective injection time T0, is calculated. Thus, it is possible to effectively improve the accuracy for the injection amount while minimizing an increase in the calculation load for recalculation of the injection time TAU.

In the third embodiment, only the second calculation section 54, out of the first calculation section 53 and the second calculation section 54, performs the correction in accordance with the presence or absence of the fuel feeding by the high-pressure fuel pump 24 during the fuel injection by the injector 20 at the time of the calculation of the injection time TAU. Instead thereof, also in the calculation of the injection time TAU of the first calculation section 53, the above correction may be performed.

In the above embodiments, the second calculation section 54 also recalculates the minimum injection time TMN (the PL minimum injection time TPMN and the FL minimum injection time TFMN) based on the acquired fuel pressure PRF upon the calculation of the injection time TAU at the time of the start of the fuel injection. In this regard, it may be configured such that the second calculation section 54 itself does not calculate these times, but the value calculated by the first calculation section 53 is used.

The fuel injection controller 50 is not limited to a device that includes a central processing unit and a memory and executes all the above-described processes through software. For example, the fuel injection controller 50 may include dedicated hardware (an application specific integrated circuit: ASIC) that executes at least part of the various processes. That is, the fuel injection controller 50 may be circuitry including 1) one or more dedicated hardware circuits such as an ASIC, 2) one or more processors (microcomputers) that operate according to a computer program (software), or 3) a combination thereof.

The invention claimed is:

1. A fuel injection controller for an internal combustion engine configured to calculate a fuel injection amount and an injection starting point of time in accordance with an operation state of the internal combustion engine, start energization to an injector at the injection starting point of time, and stop the energization to the injector when an injection time calculated based on the fuel injection amount and a fuel pressure that is a pressure of fuel supplied to the injector elapses from the injection starting point of time, the fuel injection controller comprising:
   a first calculation section configured to acquire the fuel pressure at a predetermined point of time before the injection starting point of time and calculate the injection time using the acquired fuel pressure; and
   a second calculation section configured to acquire the fuel pressure when the injection starting point of time arrives and calculate the injection time using the acquired fuel pressure,
   wherein the fuel injection controller is configured to
   set a point of time to stop the energization to the injector based on a calculation result of the injection time by the first calculation section before starting the energization to the injector, and
   reset the point of time to stop the energization to the injector based on a calculation result of the injection time by the second calculation section after starting the energization to the injector.

2. The fuel injection controller for an internal combustion engine according to claim 1, wherein, when the injection time calculated by the first calculation section is equal to or less than a predetermined value, the calculation of the injection time by the second calculation section is prohibited.

3. The fuel injection controller for an internal combustion engine according to claim 1, wherein
   each of the first calculation section and the second calculation section is configured to calculate the injection time such that the injection time is a value equal to or more than a minimum injection time that is a lower limit value of the injection time, and
   the first calculation section and the second calculation section are configured to individually calculate the minimum injection time based on the acquired fuel pressure.

4. The fuel injection controller for an internal combustion engine according to claim 1, wherein the injector is supplied with fuel by a fuel pump configured to perform an intermittent fuel feeding, and the fuel injection controller is configured to perform a correction in accordance with presence or absence of the fuel feeding by the fuel pump during the fuel injection by the injector only during the calculation of the injection time by the second calculation section of the calculation of the injection time by the first calculation section and the calculation of the injection time by the second calculation section.

5. The fuel injection controller for an internal combustion engine according to claim 1, wherein a time from a start of energization to the injector until a start of a fuel injection by the injector is defined as an ineffective injection time, a time from the start of the fuel injection by the injector until an end of the energization is defined as an effective injection time, the first calculation section is configured to calculate the ineffective injection time and the effective injection time based on the acquired fuel pressure, and calculate, as the injection time, a value obtained by totaling the calculated ineffective injection time and effective injection time, and the second calculation section is configured to calculate the ineffective injection time based on the acquired fuel pressure, and calculate, as the injection time, a value obtained by totaling the calculated ineffective injection time and the effective injection time calculated by the first calculation section.

6. The fuel injection controller for an internal combustion engine according to claim 1, wherein the fuel injection controller is configured to perform, as the fuel injection by an injector, a partial-lift injection, in which the fuel injection is ended before a nozzle of the injector is fully opened, and a full-lift injection, in which the fuel injection is ended after the nozzle of the injector is fully opened, a time from a start of energization to the injector until a start of a fuel injection by the injector is defined as an ineffective injection time, a time from the start of the fuel injection by the injector until an end of the energization is defined as an effective injection time, a time from a start of the energization to the injector until the end of the energization is defined as a total injection time, the first calculation section is configured to when performing the partial-lift injection, calculate the total injection time by using the fuel pressure and calculate a value of the total injection time as the injection time, and when performing the full-lift injection, calculate both the effective injection time and the ineffective injection time by using the fuel pressure and calculate, as the injection time, a value obtained by totaling the effective injection time and the ineffective injection time, and the second calculation section is configured to when performing the partial-lift injection, calculate the total injection time by using the fuel pressure and calculate a value of the total injection time as the injection time, and when performing the full-lift injection, calculate, by using the acquired fuel pressure, only the effective injection time of the ineffective injection time and the effective injection time, and calculate, as the injection time, a value obtained by totaling the calculated effective injection time and the ineffective injection time calculated by the first calculation section.

7. A fuel injection control method for an internal combustion engine configured to calculate a fuel injection amount and an injection starting point of time in accordance with an operation state of the internal combustion engine, start energization to an injector at the injection starting point of time, and stop the energization to the injector when an injection time calculated based on the fuel injection amount and a fuel pressure that is a pressure of fuel supplied to the injector elapses from the injection starting point of time, the method comprising:

acquiring the fuel pressure at a predetermined point of time before the injection starting point of time;

performing a first calculation of the injection time by using the acquired fuel pressure;

acquiring the fuel pressure when the injection starting point of time arrives;

performing a second calculation of the injection time by using the acquired fuel pressure;

setting a point of time to stop the energization to the injector based on a calculation result of the injection time by the first calculation before starting the energization to the injector; and resetting the point of time to stop the energization to the injector based on a calculation result of the injection time by the second calculation after starting the energization to the injector.

8. A fuel injection controller for an internal combustion engine configured to calculate a fuel injection amount and an injection starting point of time in accordance with an operation state of the internal combustion engine, start energization to an injector at the injection starting point of time, and stop the energization to the injector when an injection time calculated based on the fuel injection amount and a fuel pressure that is a pressure of a fuel supplied to the injector elapses from the injection starting point of time, the fuel injection controller comprises circuitry, which is configured to execute:

acquiring the fuel pressure at a predetermined point of time before the injection starting point of time;

performing a first calculation of the injection time by using the acquired fuel pressure;

acquiring the fuel pressure when the injection starting point of time arrives;

performing a second calculation of the injection time by using the acquired fuel pressure;

setting a point of time to stop the energization to the injector, based on a calculation result of the injection time by the first calculation before starting the energization to the injector; and resetting a point of time to stop the energization to the injector, based on a calculation result of the injection time by the second calculation after starting the energization to the injector.

* * * * *